(12) United States Patent
Hayashi

(10) Patent No.: US 10,120,228 B2
(45) Date of Patent: Nov. 6, 2018

(54) LIQUID CRYSTAL DISPLAY DEVICE

(71) Applicant: Mitsubishi Electric Corporation, Tokyo (JP)

(72) Inventor: Masami Hayashi, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 234 days.

(21) Appl. No.: 15/096,299

(22) Filed: Apr. 12, 2016

(65) Prior Publication Data

US 2016/0306208 A1    Oct. 20, 2016

(30) Foreign Application Priority Data

Apr. 20, 2015  (JP) .................................. 2015-085581

(51) Int. Cl.
*G02F 1/1335*   (2006.01)
*G02F 1/1333*   (2006.01)

(52) U.S. Cl.
CPC .... *G02F 1/13338* (2013.01); *G02F 1/133528* (2013.01); *G02F 2001/133531* (2013.01); *G02F 2001/133548* (2013.01)

(58) Field of Classification Search
CPC ........... G02F 1/13338; G02F 1/133528; G02F 2001/133531
USPC .......................................................... 349/12
See application file for complete search history.

(56) References Cited

U.S. PATENT DOCUMENTS

| | | | | |
|---|---|---|---|---|
| 2006/0050187 A1* | 3/2006 | Hirai | ..................... | G02B 5/3058 349/5 |
| 2006/0061519 A1* | 3/2006 | Fisher | ................ | G02F 1/133528 345/32 |
| 2008/0100781 A1* | 5/2008 | Choo | ................ | G02F 1/133536 349/96 |
| 2009/0273577 A1* | 11/2009 | Chen | ....................... | G06F 3/044 345/174 |
| 2009/0290105 A1 | 11/2009 | Takada | | |

(Continued)

FOREIGN PATENT DOCUMENTS

| | | |
|---|---|---|
| JP | 2008-197757 A | 8/2008 |
| JP | 2009-116433 A | 5/2009 |

(Continued)

OTHER PUBLICATIONS

Machine Translation of JP 2011170252 A, Fukushima, Masao, Sep. 2011.*

*Primary Examiner* — Lucy Chien
(74) *Attorney, Agent, or Firm* — Studebaker & Brackett PC

(57) ABSTRACT

Provided is a display device that is thin in its entirety and has a high contrast. The display device according to the present invention includes an array substrate provided with multiple pixels in array, and a counter substrate oppositely disposed above the array substrate with a liquid crystal layer interposed between the counter substrate and the array substrate. The counter substrate includes a touch sensor wiring pattern disposed in such a manner that at least part of the touch sensor wiring pattern is not parallel or orthogonal to a first polarization axis of polarization light incident on the liquid crystal layer from close to the array substrate. The counter substrate also includes a polarization layer closer to the liquid crystal layer than to the touch sensor wiring pattern, having a second polarization axis with an angle of 0 degrees or 90 degrees with respect to the first polarization axis.

19 Claims, 18 Drawing Sheets

(56) References Cited

U.S. PATENT DOCUMENTS

| | | | |
|---|---|---|---|
| 2011/0115739 A1* | 5/2011 | Song | G02F 1/13338 345/174 |
| 2012/0127404 A1 | 5/2012 | Takada | |
| 2013/0278549 A1 | 10/2013 | Hayashi et al. | |
| 2015/0092140 A1* | 4/2015 | Takakuwa | G02B 5/3058 349/96 |
| 2015/0177876 A1* | 6/2015 | Ishii | G06F 3/044 345/174 |

FOREIGN PATENT DOCUMENTS

| | | |
|---|---|---|
| JP | 2009-282437 A | 12/2009 |
| JP | 2010-286848 A | 12/2010 |
| JP | 2012-008255 A | 1/2012 |
| JP | 2013-222123 A | 10/2013 |

* cited by examiner

F I G. 1 2
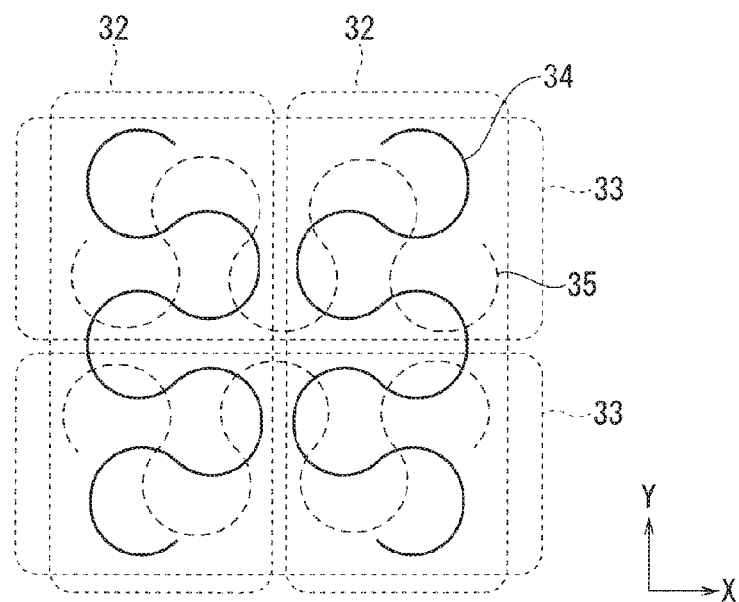
F I G. 1 3
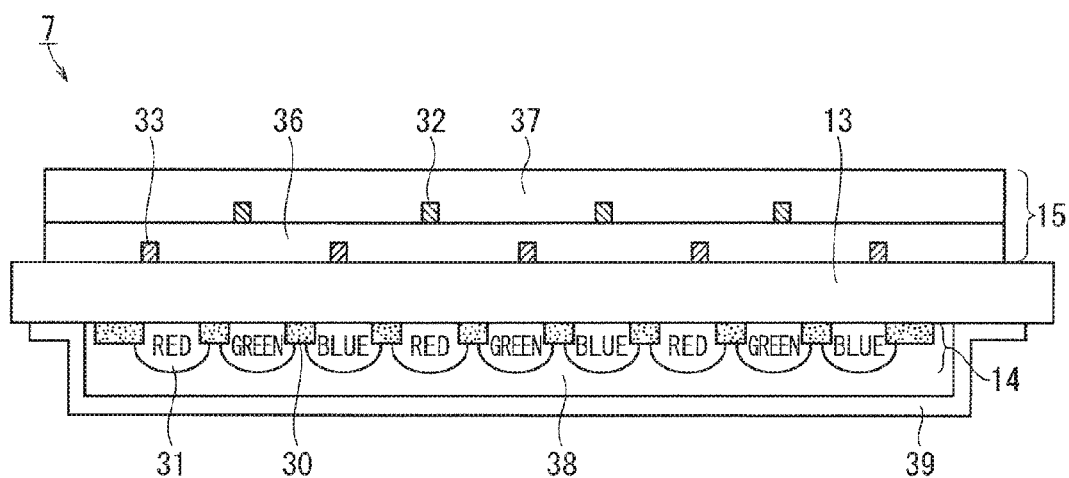

F I G. 2 7
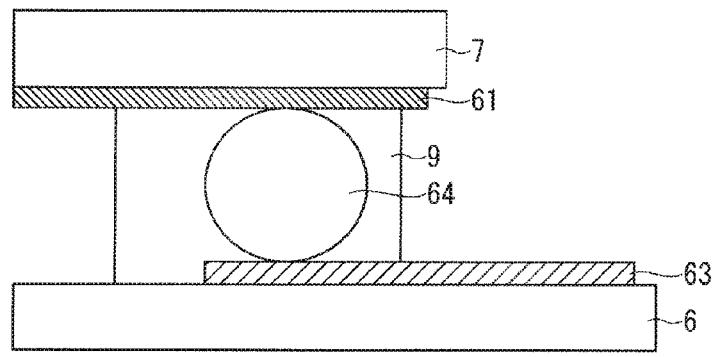
F I G. 2 8
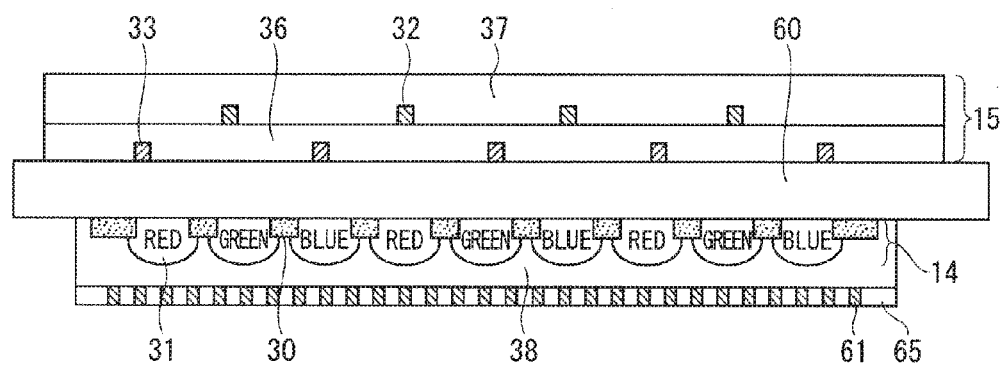
F I G. 2 9
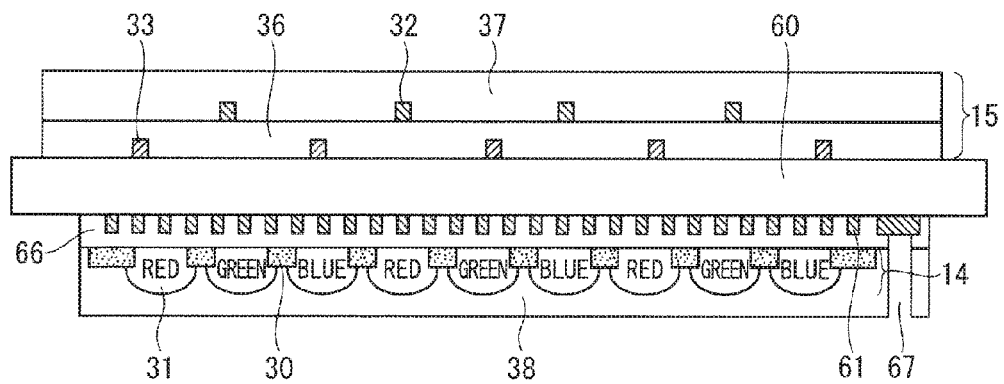

LIQUID CRYSTAL DISPLAY DEVICE

BACKGROUND OF THE INVENTION

Field of the Invention

The present invention relates to liquid crystal display devices including touch panels and particularly relates to a liquid crystal display device including an Oncell touch panel.

Description of the Background Art

Display devices, the display surfaces of which have touch sensors that detect inputs by touch operations, have been often used in recent years. A projected capacitance touch panel employs a method of forming a conductive film on a transparent substrate and detecting a variation in capacitance of touches generated in the conductive film. Such a touch panel is configured by, for example, forming conductive films on two substrates individually before sticking these substrates together, forming conductive films on both surfaces of one substrate facing each other, or forming two conductive films on one surface of one substrate.

Attaching the touch panel of the above-discussed configuration to, for example, a liquid crystal display device achieves a display device having a function of input by a touch operation. However, this display device, which is thick in its entirety, has needed to be thin. To meet such a need, an Oncell structure is considered where a sensor pattern composed of a conductive film is directly formed on a liquid crystal cell of a liquid crystal display device and a polarization film is attached outside the sensor pattern (close to the display surface) (e.g., see Japanese Patent Application Laid-Open No. 2012-8255). Meanwhile, although a transparent conductive film has been mainly employed as a material of a sensor pattern for sensor wires of a touch panel or the like, a touch panel used for a large display device is now required to have a low resistance in its sensor wires. Accordingly, the use of a metal wire is considered as a material of the sensor pattern.

However, a polarization axis of light in the vicinity of the metal wire is projected to another axis under the influence of the metal wire when the Oncell structure is applied to a touch panel that uses the metal wire. This results in a change from a state where light should be primarily modulated in a polarization film. In particular, part of light that should be primarily shielded passes through a polarization film when polarization light having a right angle to a polarization axis of the polarization film is projected to the other axis. Unfortunately, this generates a black floating (i.e., a phenomenon where a black portion of an image becomes whitish), thus reducing contrast.

Further, a straight-line metal wire causes striations where a high-brightness light source typified by sunlight scatters and diffracts at edges of the metal wire, thus causing reflection light to spread in a direction orthogonal to the metal wire.

On the other hand, employing a sensor pattern of a non-straight-line metal wire in order to reduce the visibility of the striations is difficult to conform all edges of the metal wire to the polarization axis of the polarization film. Accordingly, when the Oncell structure is employed in order for the display device to be thin in its entirety, a sensor pattern whose metal wire deviates from the polarization axis of the polarization film is formed. Consequently, black brightness rises (the black floating occurs), which causes a reduction of the contrast in an area where directions of the edges of the metal wire deviates from a direction of the polarization axis.

SUMMARY OF THE INVENTION

The present invention has been made to solve such problems. It is an object of the present invention to provide a display device that is thin in its entirety and capable of having high contrast.

A liquid crystal display device includes an array substrate provided with a plurality of pixels in array, and a counter substrate oppositely disposed above the array substrate with a liquid crystal layer interposed between the counter substrate and the array substrate. The counter substrate includes a touch sensor wiring pattern disposed in such a manner that at least part of the touch sensor wiring pattern is not parallel or orthogonal to a first polarization axis of polarization light incident on the liquid crystal layer from close to the array substrate. The counter substrate also includes a polarization layer closer to the liquid crystal layer than to the touch sensor wiring pattern, having a second polarization axis with an angle of 0 degrees or 90 degrees with respect to the first polarization axis.

According to the present invention, the display device includes the array substrate provided with the plurality of pixels in array, and the counter substrate oppositely disposed above the array substrate with the liquid crystal layer interposed between the counter substrate and the array substrate. The counter substrate includes the touch sensor wiring pattern disposed in such a manner that at least part of the touch sensor wiring pattern is not parallel or orthogonal to the first polarization axis of the polarization light incident on the liquid crystal layer from close to the array substrate. The counter substrate also includes the polarization layer closer to the liquid crystal layer than to the touch sensor wiring pattern, having the second polarization axis with the angle of 0 degrees or 90 degrees with respect to the first polarization axis. The display device is thus thin in its entirety and capable of having high contrast.

These and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a diagram illustrating still another example of the arrangements of the X-direction detection lines and the Y-direction detection lines according to the first preferred embodiment of the present invention;

FIG. 13 is a cross-sectional view illustrating an example of a configuration of a counter substrate according to the first preferred embodiment of the present invention;

FIG. 27 is a diagram illustrating a connection between the fine wire and a counter electrode terminal according to the second preferred embodiment of the present invention;

FIG. 28 is a diagram illustrating another example of the configuration of the counter substrate according to the second preferred embodiment;

FIG. 29 is a diagram illustrating still another example of the configuration of the counter substrate according to the second preferred embodiment;

DESCRIPTION OF THE PREFERRED EMBODIMENTS

The following describes preferred embodiments of the present invention on the basis of the drawings.

<First Preferred Embodiment>

Figure 1:
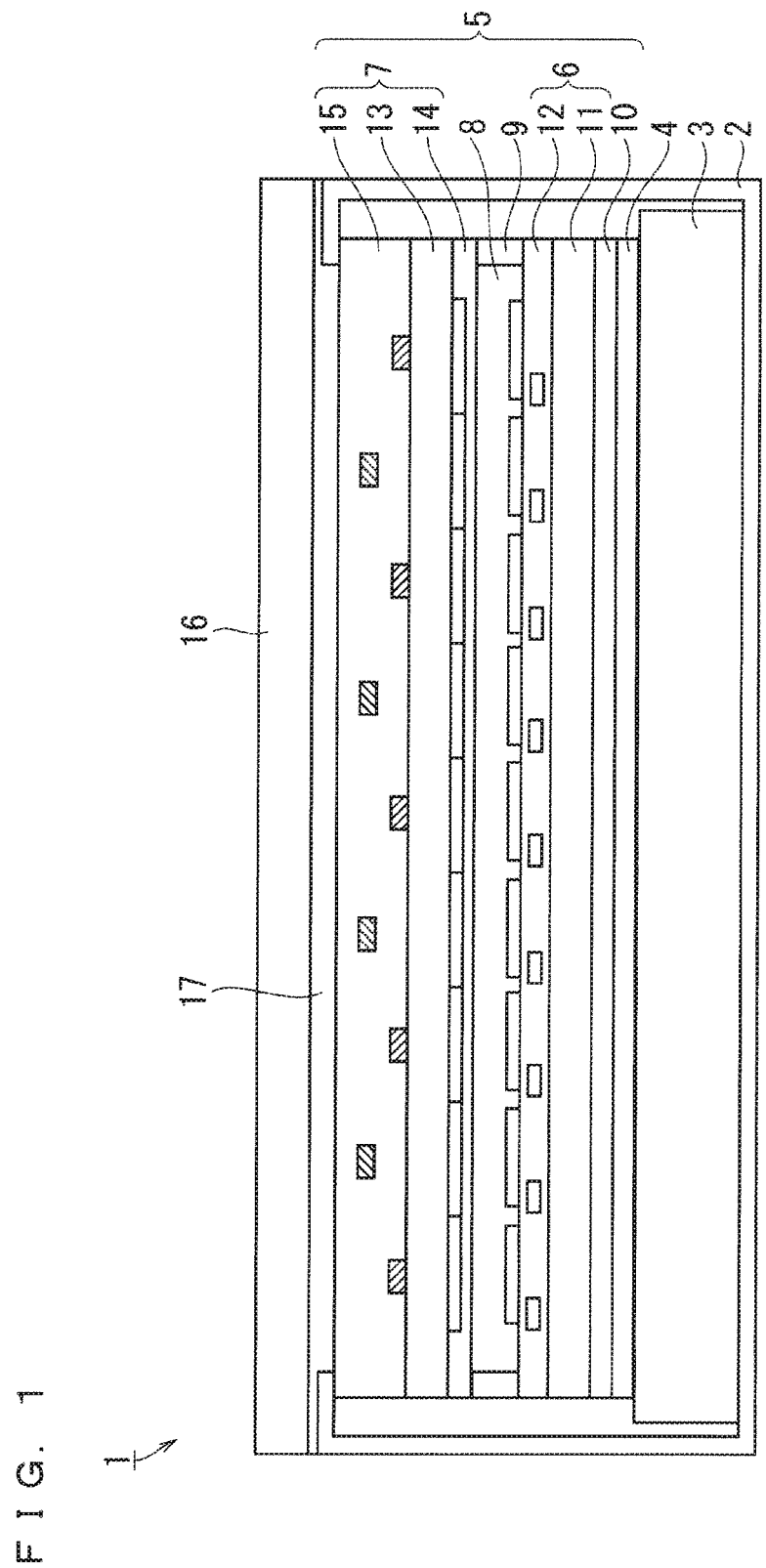
FIG. 1 is a cross-sectional view illustrating an example of a configuration of a display device according to a first preferred embodiment of the present invention.

FIG. 1 is a cross-sectional view illustrating an example of a configuration of a display device 1 according to a first preferred embodiment of the present invention.

As illustrated in FIG. 1, a backlight unit 3, an optical film 4 on the backlight unit 3, having a function of improvement in angle view for example, and a liquid crystal cell 5 on the optical film 4 are incorporated within a frame 2. Hereinafter, the individual elements incorporated within the frame 2 are correctively referred to as a display module.

A protective glass 16 is disposed on an upper surface of the display module (i.e., an upper surface of the frame 2) through an adhesive agent 17. Specifically, the protective glass 16 adheres to the liquid crystal cell 5 and the frame 2 through the adhesive agent 17. Note that for the adhesion of the protective glass 16 to the display module, the example of FIG. 1 shows, but is not limited to, adhering the protective glass 16 to the liquid crystal cell 5 and the frame 2. Another structure, such as a structure where the protective glass 16 adheres to a particular area of the frame 2 or a structure where the protective glass 16 adheres to a particular area of the liquid crystal cell 15 may be selected as necessary according to the intended use.

The liquid crystal cell 5 is formed by injecting a liquid crystal between a pixel array substrate 6 and the counter substrate 7 and then sealing the liquid crystal with a sealing agent 9. The liquid crystal sealed with the sealing agent 9 constitutes a liquid crystal layer 8.

The pixel array substrate 6 is composed of a transparent substrate 11 and a pixel array pattern 12. The pixel array pattern 12 that drives pixels is formed on a surface of the transparent substrate 11, where the surface contacts the liquid crystal layer 8. An orientation film (not shown) is formed on a surface of the pixel array pattern 12, close to the liquid crystal layer 8. Moreover, a polarization film 10 is attached on a surface of the transparent substrate 11, opposite to the pixel array pattern 12.

The counter substrate 7 is composed of a glass substrate 13, a color filter pattern 14, and a touch sensor pattern 15 (a touch sensor wiring pattern). The glass substrate 13 has a function of providing a polarization axis (a second polarization axis) orthogonal to a polarization axis (a first polarization axis) of the polarization film 10, the details of which will be described later on. That is, the glass substrate 13 is a polarization layer having a polarization function. The color filter pattern 14 is formed on a surface of the glass substrate 13, where the surface contacts the liquid crystal layer 8. An orientation film (not shown) is formed on a surface of the color filter pattern 14, close to the liquid crystal layer 8. Moreover, the touch sensor pattern 15 is formed on a surface of the glass substrate 13, opposite to the color filter pattern 14.

Note that the polarization axis in the counter substrate 7 is orthogonal to the polarization axis of the polarization film 10 in a case of a normally white mode in a twisted nematic (TN) mode. Meanwhile, a normally black mode in the TN mode or transverse electric field modes, such as an in-plane-switching mode and a fringe field switching (FFS) mode may be used. In such a case, a relationship between the polarization axis of the polarization film 10 and the polarization axis of the counter substrate 7 is simply required to be set based on each of the modes and display settings, such as setting the relationship so that the polarization axis in the counter substrate 7 is parallel to the polarization axis of the polarization film 10.

Figure 2:
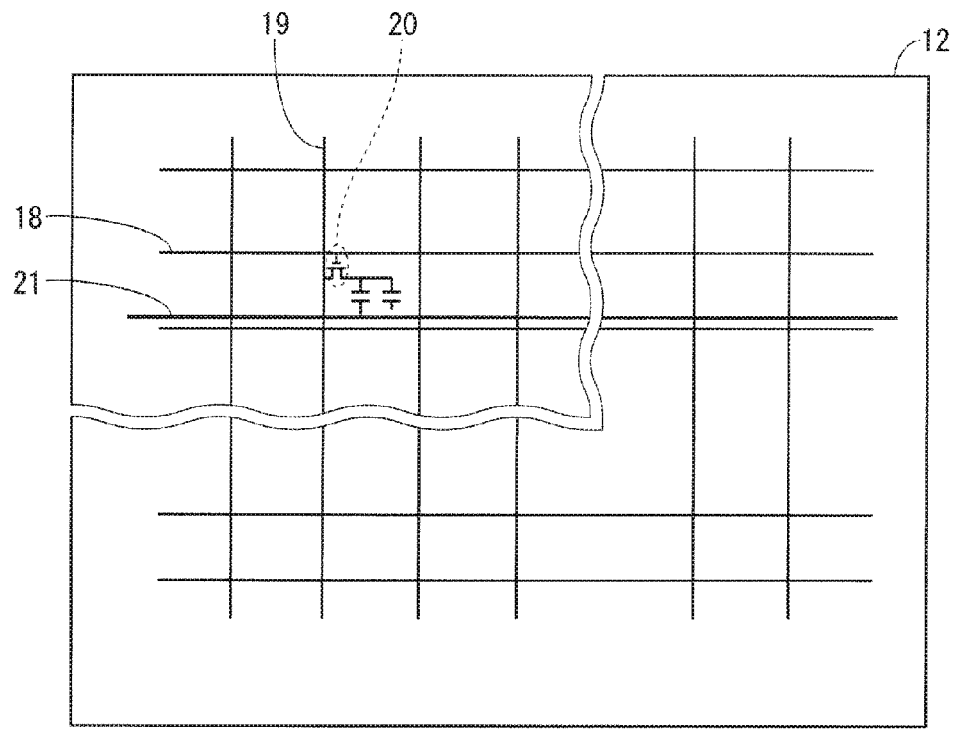
FIG. 2 is a diagram illustrating an example of a configuration of a pixel array pattern according to the first preferred embodiment of the present invention.

FIG. 2 is a diagram illustrating an example of a configuration of the pixel array pattern 12.

As illustrated in FIG. 2, the pixel array pattern 12 is composed of gate wires 18 arranged in an X direction and selecting pixels in driving the pixels, source wires 19 arranged in a Y direction and transmitting signals to each pixel, and switching elements 20 formed at intersections of the gate wires 18 and the source wires 19. One example of each switching element 20 includes a thin film transistor (TFT). Moreover, one switching element 20 constitutes one pixel. Further, a common wire 21 disposed in a direction parallel to the gate wires 18 (the X direction) and common electrodes connected to the common wire 21 are disposed in lower layers of each pixel and forms capacitances. Note that the common wire 21 may be disposed in a direction parallel to the source wires 19 (the Y direction).

Figure 3:
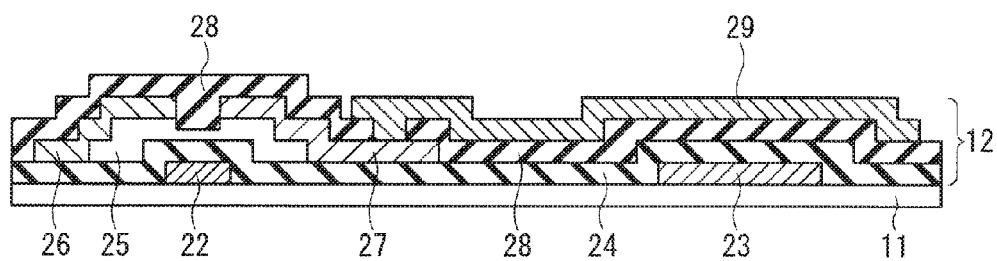
FIG. 3 is a cross-sectional view illustrating an example of a configuration of a pixel array substrate according to the first preferred embodiment of the present invention.

FIG. 3 is a cross-sectional view illustrating an example of a configuration of the pixel array substrate 6, and FIG. 3 illustrates a cross-section of one pixel.

As illustrate in FIG. 3, each pixel has the corresponding switching element 20, and a pixel electrode 29 connected to the switching element 20. A gate electrode 22 and a common electrode 23 are formed on the transparent substrate 11, and a gate insulating film 24 is formed also on the transparent substrate 11 to cover the gate electrode 22 and the common electrode 23. A semiconductor layer 25 is formed above the gate electrode 22 and on the gate insulating film 24. A source electrode 26 and a drain electrode 27 are formed on the semiconductor layer 25, facing each other. An interlayer insulating film 28 covers the gate insulating film 24, the semiconductor layer 25, the source electrode 26, and the drain electrode 27. Further, the interlayer insulating film 28 is partially open so that the drain electrode 27 and the pixel electrode 29 are electrically connected to each other. The pixel electrode 29 is formed on the interlayer insulating film 28 and from above the common electrode 23 through a part on the drain electrode 27. Note that the gate electrode 22 is electrically connected to the gate wire 18; the common electrode 23, to the common wire 21; and the source electrode 26, to the source wire 19.

Figure 4:
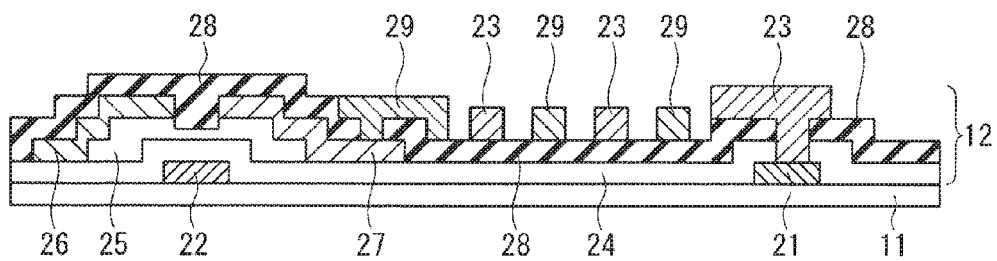
FIG. 4 is a cross-sectional view illustrating another example of the configuration of the pixel array substrate according to the first preferred embodiment of the present invention.

FIG. 4 is a cross-sectional view illustrating another example of the configuration of the pixel array substrate 6.

As illustrated in FIG. 4, slits may be formed in the pixel electrode 29 and the common electrode 23, to arrange the pixel electrode 29 and the common electrode 23 alternately. At this time, the common electrode 23 and the common wire 21 are electrically connected to each other through an opening formed in the gate insulating film 24 and interlayer insulating film 28.

Figure 5:
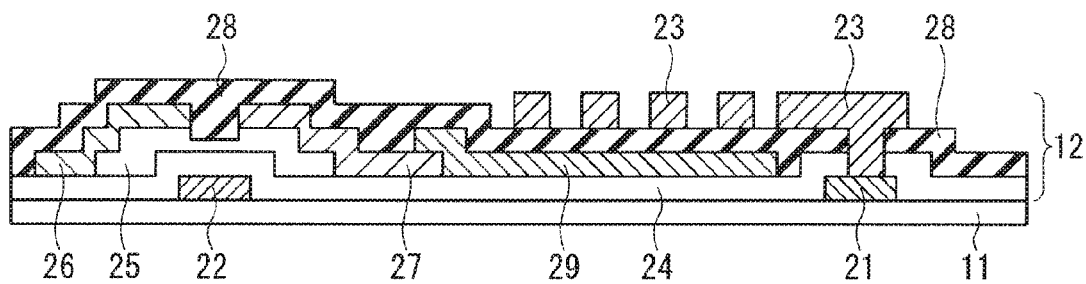
FIG. 5 is a cross-sectional view illustrating still another example of the configuration of the pixel array substrate according to the first preferred embodiment of the present invention.

FIG. 5 is a cross-sectional view illustrating still another example of the configuration of the pixel array substrate 6.

As illustrated in FIG. 5, the common electrode 23 having the slits formed through the interlayer insulating film 28 may be arranged above the pixel electrode 29. Note that the pixel electrode 29 and the common electrode 23 may be disposed in an opposite way. That is, the pixel electrode 29 having the slits formed through the interlayer insulating film 28 may be arranged above the common electrode 23.

Figure 6:
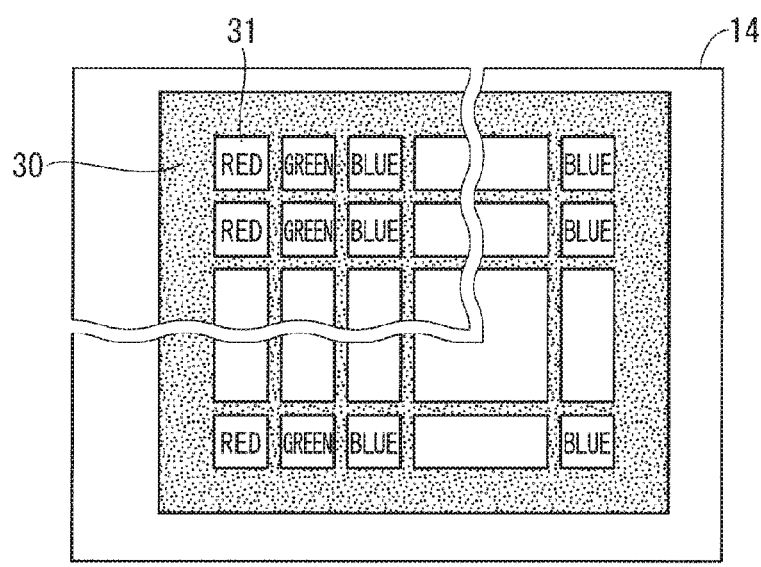
FIG. 6 is a diagram illustrating an example of a configuration of a color filter pattern according to the first preferred embodiment of the present invention.

FIG. 6 is a diagram illustrating an example of a configuration of the color filter pattern 14.

As illustrated in FIG. 6, the color filter pattern 14 has a black matrix (BM) 30 that shields light at a position facing each wire of the pixel array pattern 12. Color materials 31 of red (R), green (G) and blue (B) are formed in an area surrounded by the black matrix 30 and facing the pixel electrode 29 (e.g., see FIG. 3). An overcoat is formed on each of the color materials 31 (e.g., see FIG. 13). A transparent conductive film serving as a counter electrode 39 is formed on the overcoat.

Figure 7:
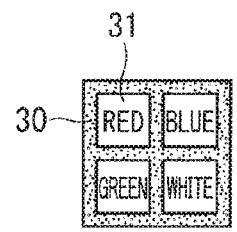
FIG. 7 is a diagram illustrating another example of the configuration of the color filter pattern according to the first preferred embodiment of the present invention.
Figure 8:
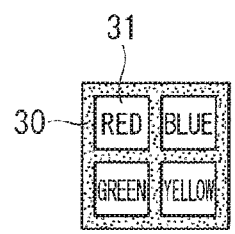
FIG. 8 is a diagram illustrating still another example of the configuration of the color filter pattern according to the first preferred embodiment of the present invention.

Note that the color materials 31 need not be arranged when the display device 1 is displayed in black and white or when a backlight is colored. Further, as illustrated in FIGS. 7 and 8, an additional color material other than R, G, and B, such as white (W; free from a color material) or yellow may be disposed for improving the reproducibility of color.

Figure 9:
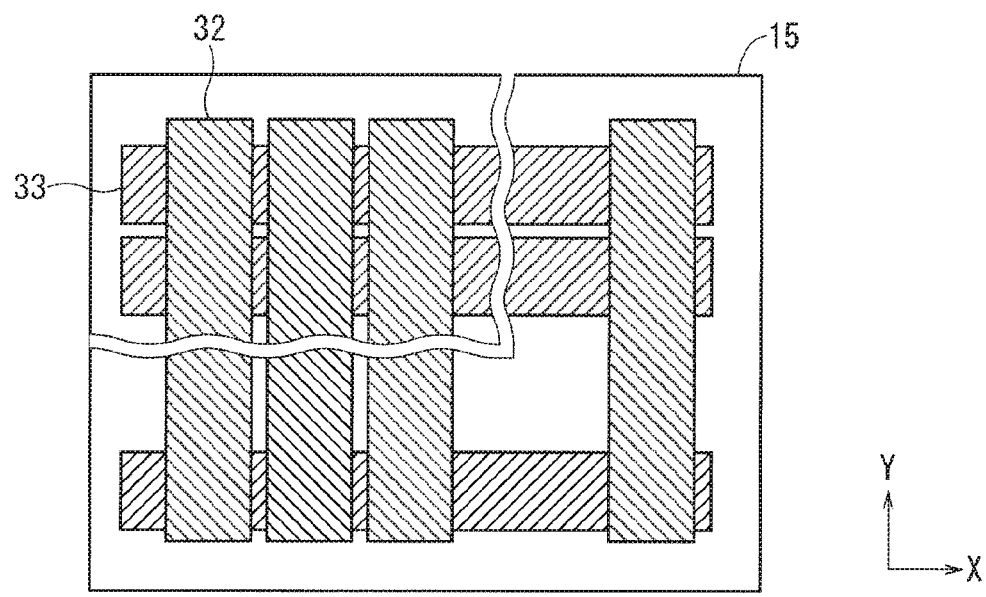
FIG. 9 is a diagram illustrating an example of a configuration of a touch sensor pattern according to the first preferred embodiment of the present invention.

FIG. 9 is a diagram illustrating an example of a configuration of the touch sensor pattern 15.

As illustrated in FIG. 9, the touch sensor pattern 15 is formed by X-direction detection lines 32 arranged in a Y direction, where each line 32 has a width of several mm, and Y-direction detection lines 33 arranged in an X direction orthogonal to the X-direction detection lines 32, where each line 33 has a width of several mm. The X-direction detection lines 32 and the Y-direction detection lines 33 are formed periodically and repeatedly in the X and Y directions according to a detection area while having necessary lengths and the necessary number of lines.

Figure 10:
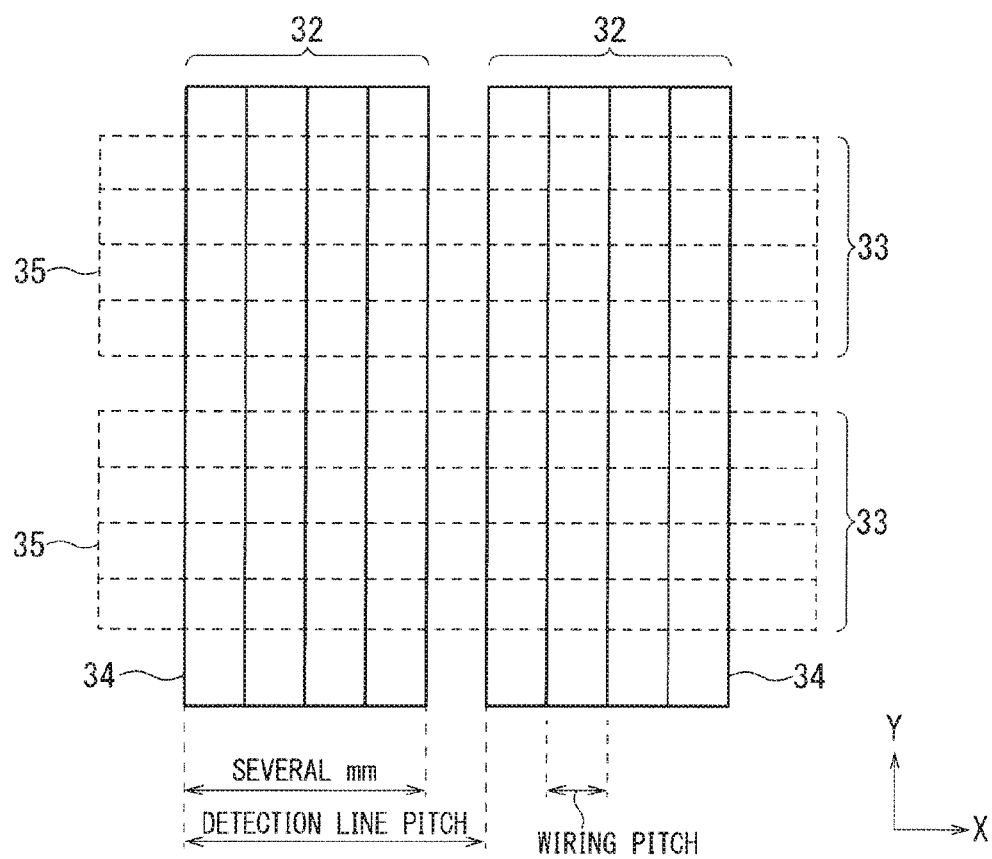
FIG. 10 is a diagram illustrating an example of arrangements of X-direction detection lines and Y-direction detection lines according to the first preferred embodiment of the present invention.

FIG. 10 is a diagram illustrating an example of arrangements of the X-direction detection lines 32 and the Y-direction detection lines 33.

As illustrated in FIG. 10, each X-direction detection line 32 and each Y-direction detection line 33 are respectively composed of conductive material wires 34 and 35 each formed in parallel at given wiring pitches so that the wires 34 and 35 are the widths of each of the X-direction detection line 32 and the Y-direction detection line 33 in their entirety, where each of the conductive material wires 34 and 35 is made of a conductive material film having a width of around three μm. Further, the conductive material wires 34 are formed to be mutually in electrical continuity, and so are the conductive material wires 35.

The wiring pitches of the touch sensor pattern 15 are selected so that their periodicity is not emphasized based on a relationship between the wiring pitches of the touch sensor pattern 15 and wiring pitches of the gate wire 18 and source wire 19. This reduces moire that occurs in overlaying lattice-like patterns on each other. A most preferable form is configured such that the wiring pitches of the touch sensor pattern 15 are the same as the wiring pitches of the gate wire 18 and source wire 19.

Figure 11:
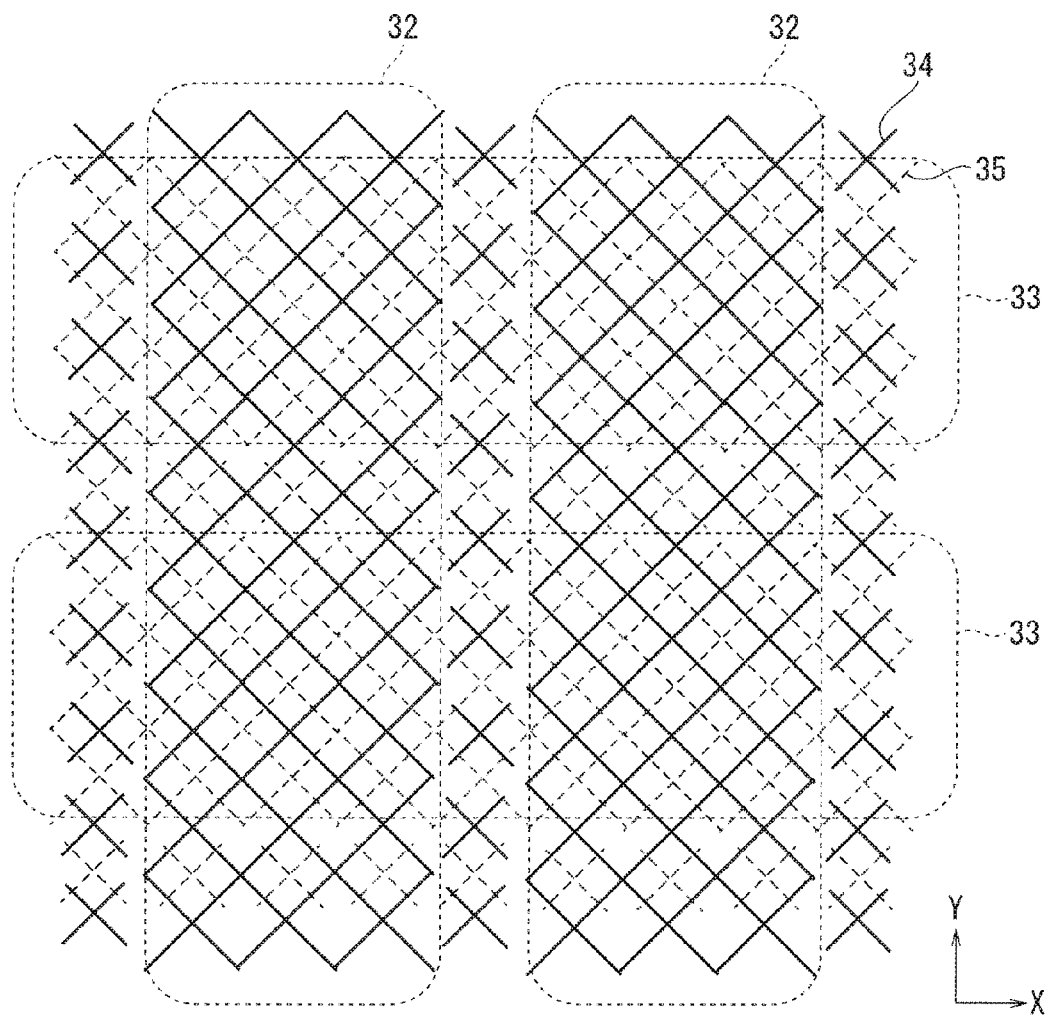
FIG. 11 is a diagram illustrating another example of the arrangements of the X-direction detection lines and the Y-direction detection lines according to the first preferred embodiment of the present invention.

FIG. 11 is a diagram illustrating another example of the arrangements of the X-direction detection lines 32 and the Y-direction detection lines 33.

As illustrated in FIG. 11, forming the X-direction detection lines 32 and the Y-direction detection lines 33 so as to arrange the conductive material wires 34 and conductive material wires 35 allows a reduction in visibility of the moire when compared to the arrangement illustrated in FIG. 10.

As illustrated in FIGS. 10 and 11, when the touch sensor pattern 15 has a straight-line shape, striations where a high-brightness light source typified by sunlight scatters and diffracts at edges of the X-direction detection lines 32 and the Y-direction detection lines 33, thus causing reflection light to spread in a direction orthogonal to the X-direction detection lines 32 and the Y-direction detection lines 33. As one method of preventing this striation phenomenon, the X-direction detection lines 32 and the Y-direction detection wire 33 each may have a curved-line shape. Forming the X-direction detection lines 32 and the Y-direction detection wire 33 in curved line advantageously disperses directions of the striations.

Note that the shapes of each of the X-direction detection lines 32 and each of the Y-direction detection lines 33, as indicated in FIGS. 10, 11 and 12 are image shapes indicating straight-line shape, obliquely-straight-line shape and curved-line shape of each of the X-direction detection lines 32 and the Y-direction detection lines 33. Actual arrangements (wiring patterns) of the X-direction detection lines 32 and the Y-direction detection lines 33 are properly optimized.

FIG. 13 is a cross-sectional view illustrating an example of a configuration of the counter substrate 7.

As illustrated in FIG. 13, the counter substrate 7 has the touch sensor pattern 15 formed on the glass substrate 13 (a surface opposite to the liquid crystal layer 8) as a transparent substrate having the polarization function. The color filter pattern 14 is formed on a surface of the glass substrate 13, opposite to the touch sensor pattern 15.

The X-direction detection lines 32 (upper layer wires) and the Y-direction detection lines 33 (lower layer wires) each are formed in different layers through an interlayer insulating film 36. That is, the X-direction detection lines 32 and the Y-direction detection lines 33 are arranged to cross each other through the interlayer insulating film 36 when viewed stereoscopically. A protective insulating layer 37 is formed on the X-direction detection lines 32 to cover the X-direction detection lines 32.

Here, each Y-direction detection line 33 is formed on the glass substrate 13 as a wire composed of a stacked film in which an Al alloy film, a semi-transparent Al film containing high nitride, and an IZO film are sequentially stacked from a lower layer (a layer close to the liquid crystal layer 8), for example (e.g., Japanese Patent Application Laid-Open No. 2013-222123). The interlayer insulating film 36 is composed of a stacked film in which an application insulating film and a SiO2 film are sequentially stacked from a lower layer, for example. Each X-direction detection line 32 is composed of a stacked film in which an Al alloy film, a semi-transparent Al film containing high nitride, and an IZO film are sequentially stacked from a lower layer, for example. The protective insulating film 37 is composed of a stacked film in which an application insulating film and a SiO2 film are sequentially stacked from a lower layer, for example. The first preferred embodiment employs a structure using these stacked films for the touch sensor pattern 15. This decreases reflectances in the surfaces of the X-direction detection line 32 and Y-direction detection line 33, thus to prevent the X-direction detection line 32 and Y-direction detection line 33 from being visually identified under external light.

Note that individual compositions of the X-direction detection line 32 and Y-direction detection line 33 are, but not limited to, the stacked film of the Al alloy film, the semi-transparent Al film containing high nitride and the IZO film as discussed above. For example, the composition may be selected properly from a structure mainly made of a low-resistance conductive film, such as a single layer of an Al alloy, a structure mainly made of the Al alloy, a structure mainly made of a Cu alloy, or a structure mainly made of a Mo alloy, according to each characteristic required for the X-direction detection line 32 and Y-direction detection line 33.

Further, individual compositions of the interlayer insulating film 36 and the protective insulating film 37 are, but not limited to, the stacked film of the application insulating film and the SiO2 film. For example, a single layer of the application insulating film, a multilayer of the application insulating film, a single layer of the SiO2 film, or a stacked film of a different inorganic insulating film may be used. The interlayer insulating film 36 and the protective insulating film 37 are preferably configured to prevent reflection in a boundary surface of the counter substrate 7, the adhesive agent 17, and an air space or the like.

The color materials 31 of red, green and blue are sequentially formed in the color filter pattern 14 so as to partially overlap the black matrix 30. The overcoat 38 is formed to cover the color filter pattern 14, and a counter electrode 39 is formed on the overcoat 38 as necessary.

Figure 14:
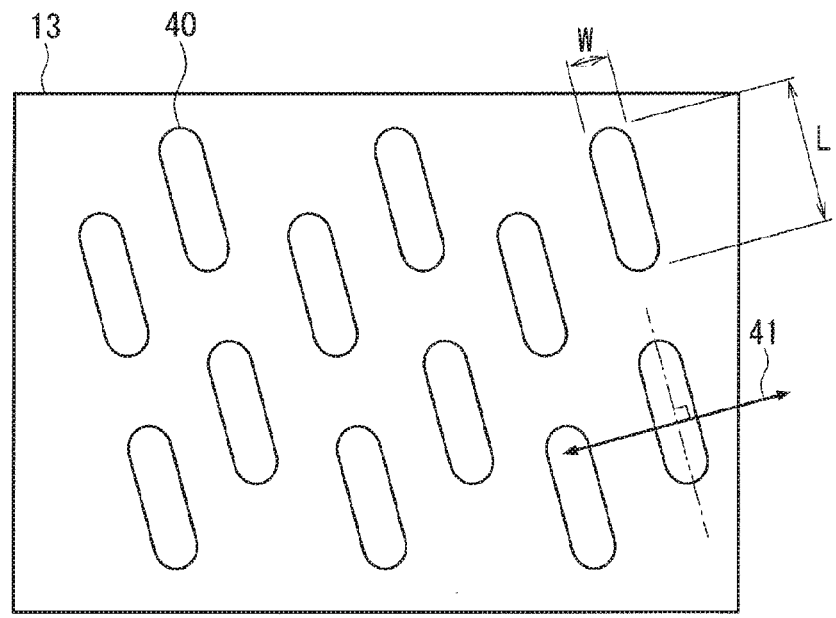
FIG. 14 is a plan view illustrating an example of a configuration of a glass substrate according to the first preferred embodiment of the present invention.

FIG. 14 is a plan view illustrating an example of a configuration of the glass substrate 13, and FIG. 14 illustrates conductive particles 40 arranged in the glass substrate 13.

As illustrated in FIG. 14, the conductive particles 40 each have length L and width W, and are aligned in the substantially same direction. Such an alignment allows the glass substrate 13 to have a polarization axis in an orthogonal direction with respect to a length direction of each conductive particle 40 (a polarization-axis-direction 41). The following describes various forms of the conductive particles 40 arranged in the glass substrate 13.

Figure 15:
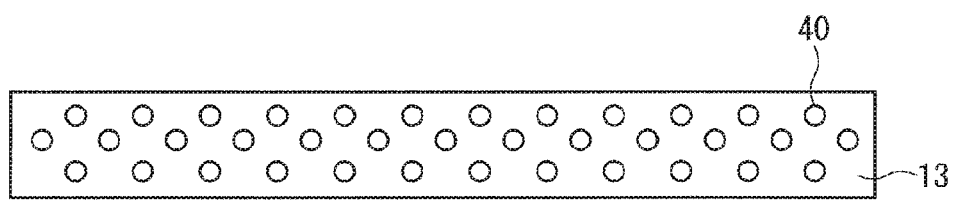
FIG. 15 is a cross-sectional view illustrating the example of the configuration of the glass substrate according to the first preferred embodiment of the present invention.

FIG. 15 is a cross-sectional view illustrating the example of the configuration of the glass substrate 13, and FIG. 15 illustrates a form in which the conductive particles 40 are dispersed within the glass substrate 13.

As illustrated in FIG. 15, the glass substrate 13 has the conductive particles 40 dispersed at a content of 1 wt %, where each particle 40 is made of, for example, silver having a longitudinal diameter of 100 to 500 nm in the same direction as the polarization axis of the polarization film 10 and having an aspect ratio of two or more.

Note that although the longitudinal diameter, aspect ratio and content of each conductive particle 40 simply need to be set properly depending on its polarization characteristic, transmittance or the like, the width W is preferably 50 nm or smaller. Moreover, the conductive particle 40 may be made of not only silver, but also a silver compound. In addition, a material of the conductive particle 40 may be properly selected from a conductive material, e.g., copper, suitable for processing and formation instead of silver.

Further, a material other than the conductive particle 40 may be used if the aspect ratio of the material is large. Instead of the conductive particle 40, a conductive material having a large aspect ratio, such as a conductive nano-fiber, or a quenching particle or fiber having a large aspect ratio may be dispersed so as to have a long axis in the same direction as the polarization axis of the polarization film 10 within a glass substrate 42. The term "quenching" here means a property of non-transmission of light in a direction perpendicular to the polarization axis (absorption or reflection by oscillation of an electron).

The configuration of the glass substrate 13 includes, but is not limited to, providing a polarization function within the glass substrate 13 as discussed above. For example, an organic transparent substrate may be used. In this case, a conductive polymer, a quenching polymer (e.g., a dye polymer), or a quenching compound (e.g., an iodine compound), each having a large aspect ratio, may be selected.

Figure 16:
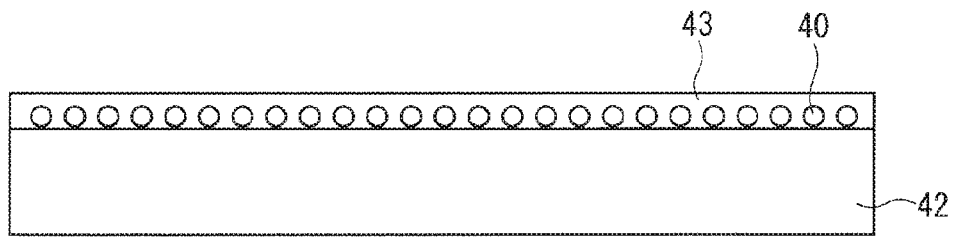
FIG. 16 is a cross-sectional view illustrating another example of the configuration of the glass substrate according to the first preferred embodiment of the present invention.
Figure 17:
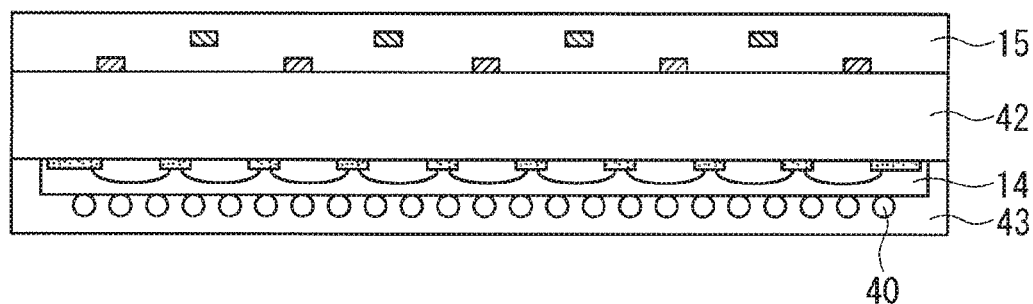
FIG. 17 is a cross-sectional view illustrating another example of the configuration of the counter substrate according to the first preferred embodiment of the present invention.

The above description is about dispersing materials, such as the conductive particles 40 within the glass substrate 13, thus adding the polarization function. However, an area where the materials, such as the conductive particles 40 are dispersed is, but not limited to the glass substrate 13. For example, the conductive particles 40 may be applied to the surface of the glass substrate 42 as illustrated in FIG. 16. In this case, a protective film 43 covering the conductive particles 40 is desirably formed. Note that conductive particles 40 may be applied so that a long axis of each conductive particle 40 is oriented in the same direction as the polarization axis of the polarization film 10. Materials, such as the conductive particles 40 are not dispersed within the glass substrate 42. The conductive particles 40 may be applied either between the touch sensor pattern 15 and the glass substrate 13 or between the color filter pattern 14 and the glass substrate 13. Moreover, the conductive particles 40 may be applied to the surface of the color filter pattern 14, close to the liquid crystal layer 8 as illustrated in FIG. 17.

Next, the following describes formation of the color filter pattern 14 and touch sensor pattern 15 in the counter substrate 7.

The formation of the touch sensor pattern 15 is initially described.

Figure 18:
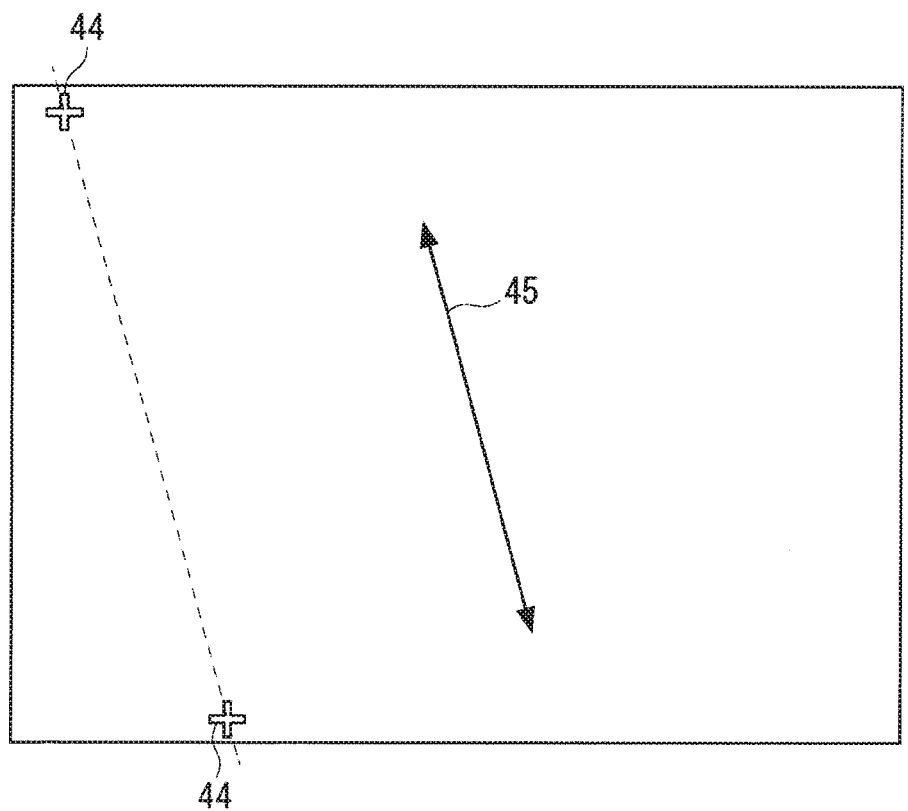
FIG. 18 is a diagram illustrating an example of polarization-axis-direction marks of the glass substrate according to the first preferred embodiment of the present invention.

FIG. 18 is a diagram illustrating an example of polarization-axis-direction marks 44 of the glass substrate 13.

As illustrated in FIG. 18, at least one of the color filter pattern 14 and the touch sensor pattern 15 has the polarization-axis-direction marks 44 (first marks) individually formed at two positions, where the marks indicate the direction of the polarization axis of the polarization function that is formed within the glass substrate 13 (see FIGS. 14 and 15). A straight-line direction for connecting the polarization-axis-direction marks 44 is a direction of the polarization axis. Note that although FIG. 18 illustrates one example of forming the polarization-axis-direction marks 44 at the two positions, the number of positions is not limited to the two positions if the direction of the polarization axis is identified.

Figure 19:
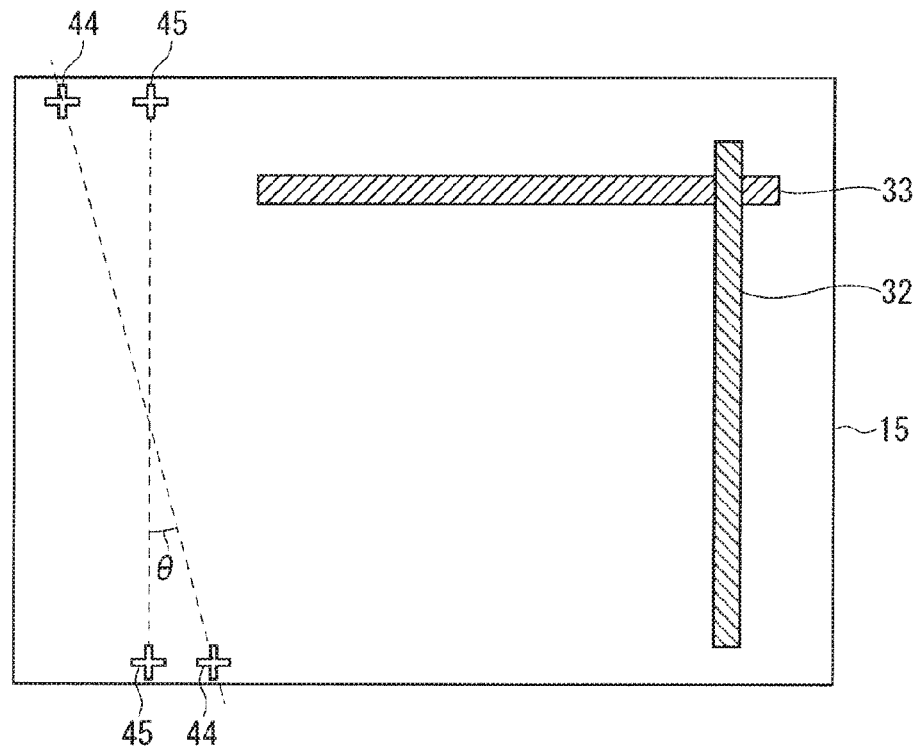
FIG. 19 is a diagram illustrating an example of the configuration of the touch sensor pattern according to the first preferred embodiment of the present invention.

For example, positioning the outer periphery of a substrate commonly specifies where to form a pattern of the Y-direction detection lines, which are the lower layer wires in the touch sensor pattern 15, in a photoengraving process of forming the pattern. Such a method is, however, hard to strictly control a relationship between the direction of the polarization axis and the direction of edges of the Y-direction detection lines. The first preferred embodiment, on the other hand, describes locating each Y-direction detection line 33 and forming touch sensor alignment marks 45 (second marks) so that the Y direction, which is an arrangement direction of the Y-direction detection lines 33, and the polarization-axis-direction marks 44 form angle θ, as illustrated in FIG. 19, for example, when the pattern of the Y-direction detection lines 33 are formed. Here, the touch sensor alignment marks 45 indicate the arrangement direction of the Y-direction detection lines 33. That is, a straight-line direction for connecting the touch sensor alignment marks 45 is the arrangement direction of the Y-direction detection lines 33.

Subsequently, where to form the X-direction detection lines 32, which are the upper layer wires, is specified relative to the touch sensor alignment marks 45.

The above method allows the angle formed by the direction of the polarization axis and a Y-axis direction to be controlled directly and strictly. This controls a relationship between an edge direction of the X-direction detection lines 32 or an edge direction of the Y-direction detection lines 33, and the direction of the polarization axis as well.

Next, formation of the color filter pattern 14 is described.

Figure 20:
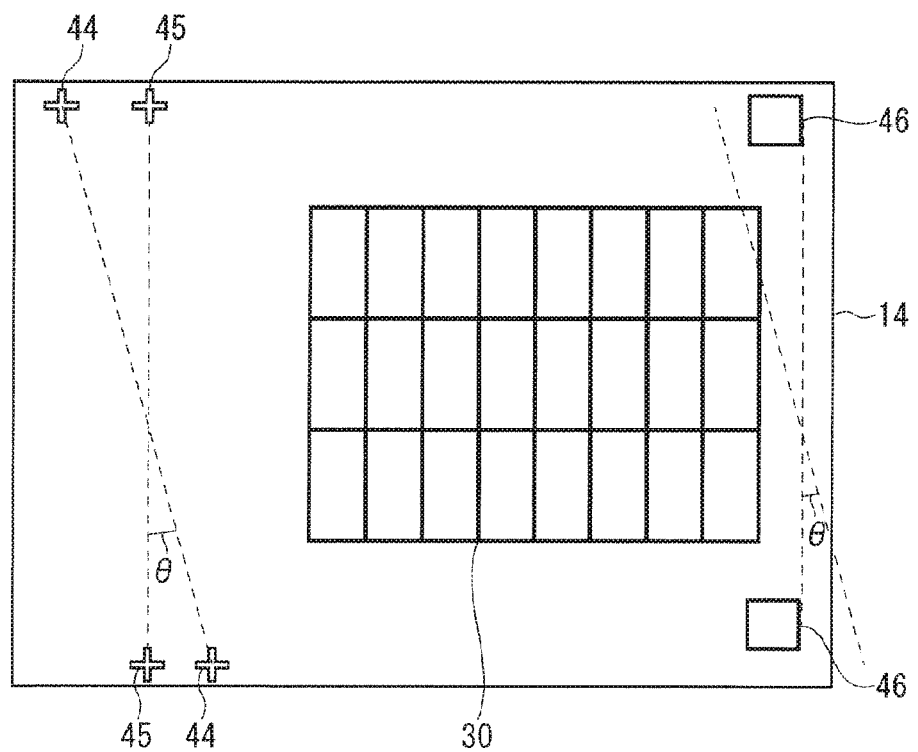
FIG. 20 is a diagram illustrating an example of formation of the color filter pattern according to the first preferred embodiment of the present invention.

FIG. 20 is a diagram illustrating an example of the formation of the color filter pattern 14.

As illustrated in FIG. 20, where to form the black matrix 30 is specified relative to the touch sensor alignment marks 45 formed in the touch sensor pattern 15. Color filter alignment marks 46 (third marks) are formed by using the black matrix 30 in forming the black matrix 30. Where to form a pattern of the color materials 31 is specified relative to the color filter alignment marks 46. In this way, the counter substrate 7 is created.

Note that the formation of the color filter pattern 14 includes, but is not limited to, forming the color filter pattern 14 relative to the touch sensor alignment marks 45, which are formed in the formation of the touch sensor pattern 15, as discussed above. For example, either the color filter pattern 14 may be formed relative to the polarization-axis-direction marks 44, or the touch sensor pattern 15 may be formed relative to the color filter alignment marks 46 after the color filter pattern 14 is formed relative to the polarization-axis-direction marks 44. Moreover, the conductive particles 40 may be formed relative to the touch sensor alignment marks 45 or the color filter alignment marks 46.

Next, the following describes an example of using the polarization-axis-direction marks 44 for a rubbing process.

Figure 21:
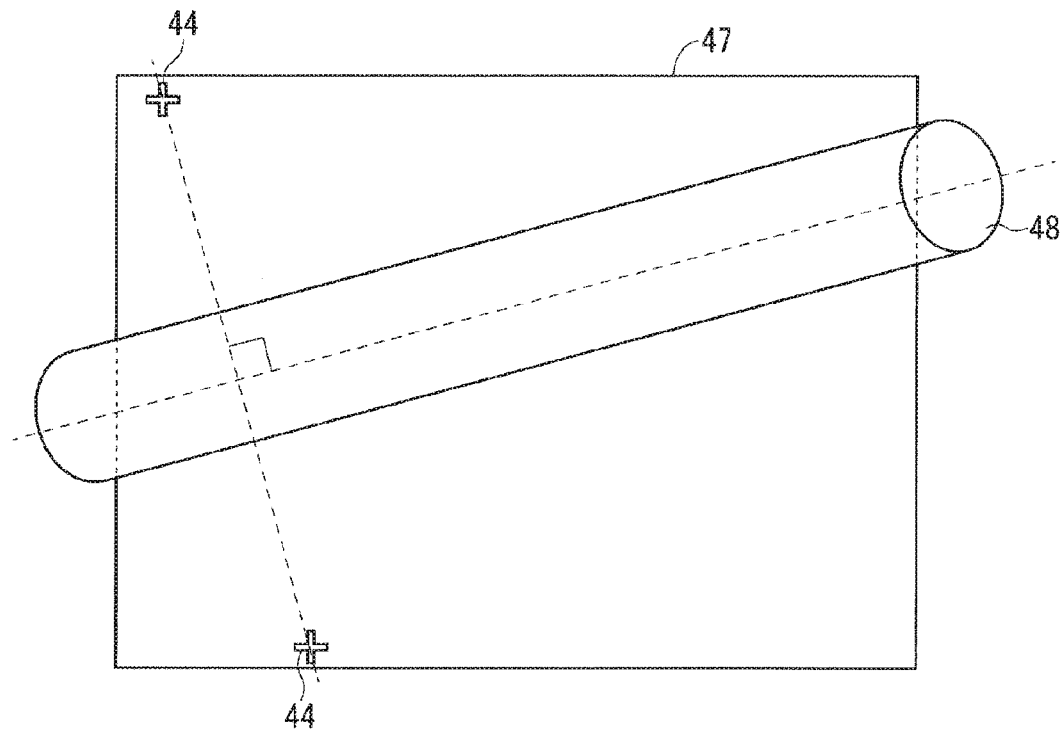
FIG. 21 is a diagram illustrating an example of a rubbing process according to the first preferred embodiment of the present invention.

FIG. 21 is a diagram illustrating an example of the rubbing process.

As illustrated in FIG. 21, an orientation film 47 is formed on the surface of the color filter pattern 14, close to the liquid crystal layer 8, and an orientation direction of a liquid crystal is determined by using a commonly known means, such as rubbing with a rubbing roller 48. In the TN mode, for example, an axial direction of the rubbing roller is oriented perpendicularly to a straight line for connecting the polarization-axis-direction marks 44, thus to reduce processing errors of a polarization axis direction and the orientation direction of the liquid crystal.

Note that the axial direction of the rubbing roller 48 may be set relative to the touch sensor alignment marks 45 or the color filter alignment marks 46.

Although the angle formed by the axis of the rubbing roller 48 and the straight line for connecting the polarization-axis-direction marks 44 is perpendicular in the TN mode in the above discussion, an optimal value simply needs to be set according to modes of the liquid crystal.

Next, the following describes effects of the display device 1 according to the first preferred embodiment.

Consider a case of displaying a black color (display in black) that does not transmit light in a conventional display device. To exclude the light from being transmitted in a polarization film on a display surface, light including only a direction perpendicular to a polarization axis direction of the polarization film needs to be transmitted after the light passes through a touch sensor pattern. However, wires in the touch sensor pattern can cause a problem of, for example, a reduction in contrast as mentioned earlier. The following describes such a problem.

Figure 22:
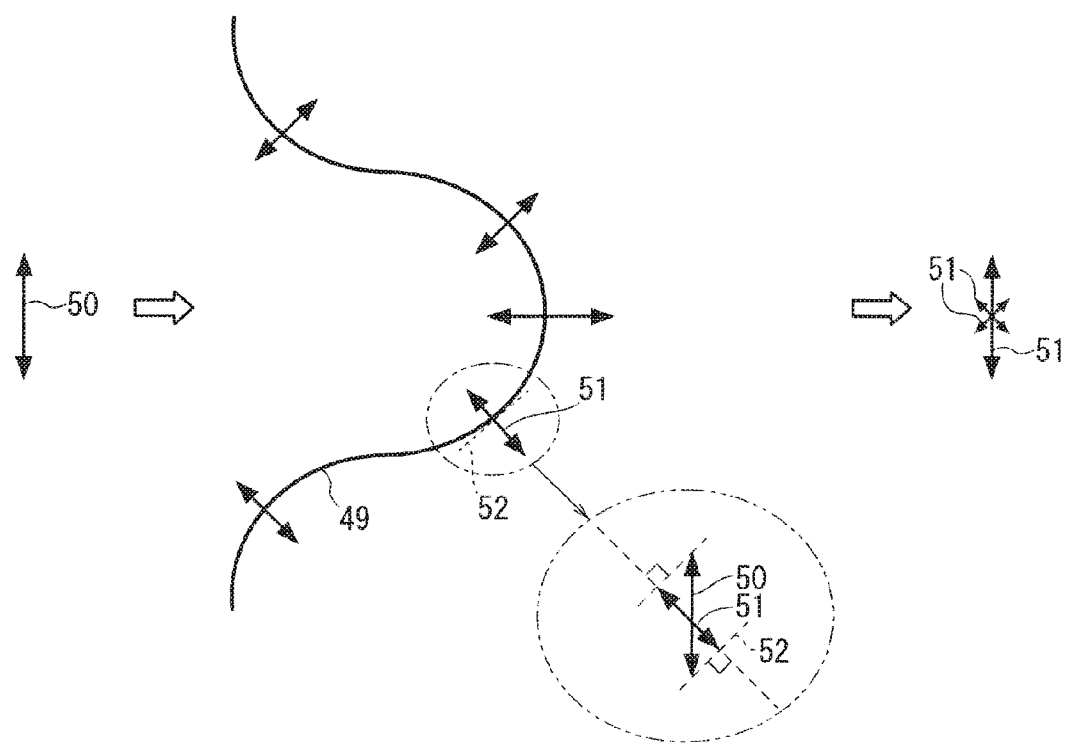
FIG. 22 is a diagram illustrating a polarization state before and after light passes through the touch sensor pattern.

FIG. 22 is a diagram illustrating polarization states before and after light passes through the touch sensor pattern.

As illustrated in FIG. 22, the polarization state of the light that has not yet passed through the touch sensor pattern includes a component in only one direction of a pre-passing polarization axis direction 50. Then, the light, when passing through the touch sensor pattern, is projected in a direction perpendicular to an edge of a wire 49 (a tangent 52 in FIG. 22) forming the touch sensor pattern in an area in the vicinity of the edge of the wire 49. The polarization state of the light that has passed through the area in the vicinity of the edge of the wire 49 includes a component of the pre-passing polarization axis direction 50 and a component of a post-passing polarization axis direction 51 (a component deviated from the pre-passing polarization axis direction 50). Meanwhile, no such phenomenon occurs in light passing through an area other than the area in the vicinity of the edge of the wire 49.

Next, the following describes polarization states of light before and after transmission of the light when the display device is displayed in black.

Figure 23:
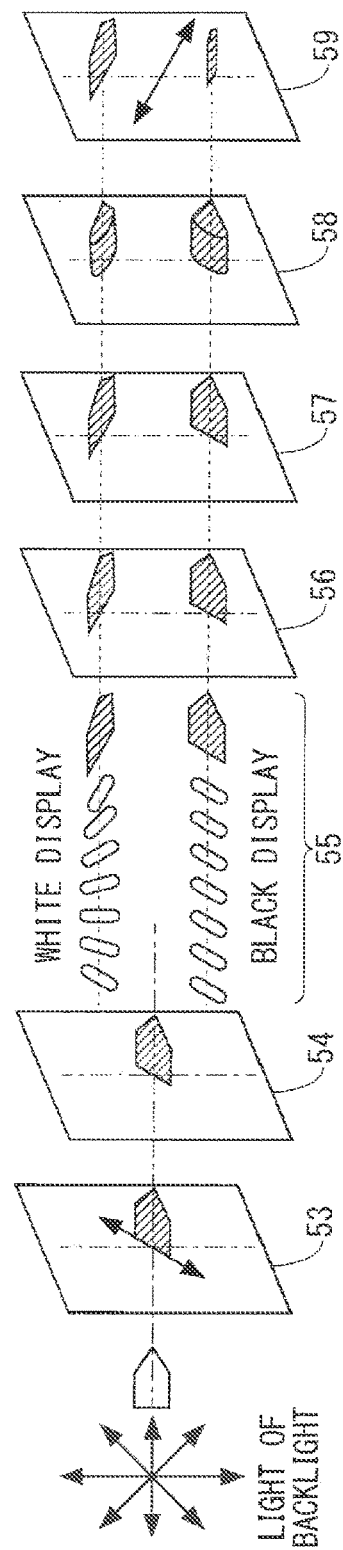
FIG. 23 is a diagram illustrating a polarization state in a conventional display device.

FIG. 23 is a diagram illustrating a polarization state in the conventional display device. Further, FIG. 24 is a diagram illustrating a polarization state in the display device 1 according to the first preferred embodiment of the present invention.

As illustrated in FIG. 23, light emitted from a backlight passes through a polarization film 53, a pixel array substrate 54, a liquid crystal layer 55, a color filter pattern 56, a glass substrate 57, a touch sensor pattern 58, and a polarization film 59 sequentially in the conventional display device. At this time, light that has passed through an area in the vicinity of an edge of a wire in the touch sensor pattern 58 includes a component that is not in a direction perpendicular to a polarization axis of the polarization film 53 and passes through the polarization film 59 while having this component. Hence, the light has some degree of brightness in a black state. This phenomenon causes the reduction in contrast.

Figure 24:
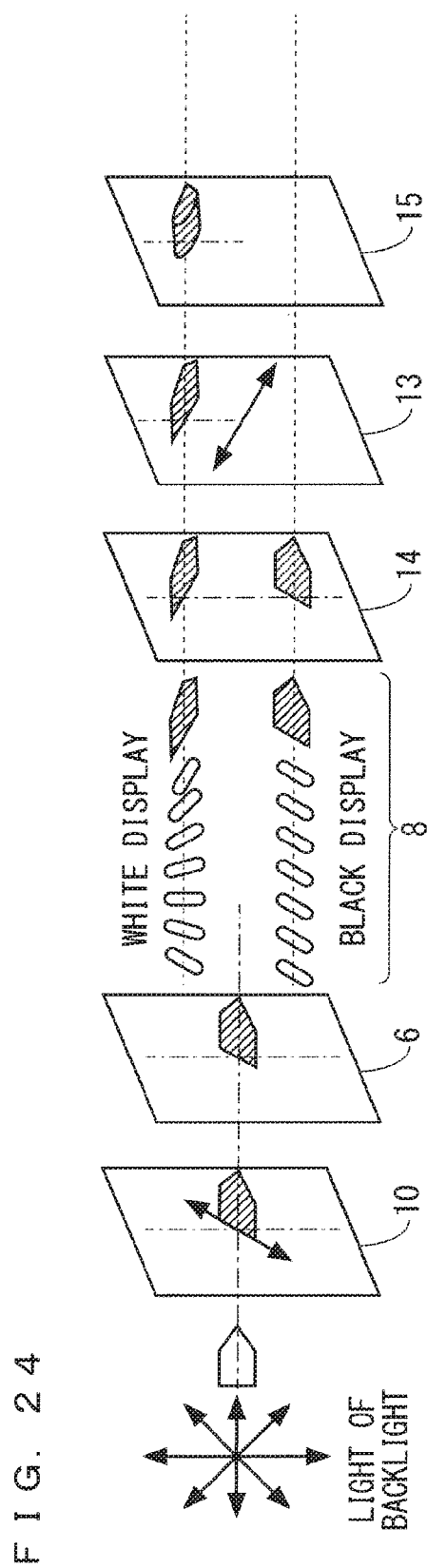
FIG. 24 is a diagram illustrating a polarization state in the display device according to the first preferred embodiment of the present invention.

In contrast, as illustrated in FIG. 24, the display device 1 according to the first preferred embodiment is configured such that regulation of light is completed by the glass substrate 13 having the polarization function before light reaches the touch sensor pattern 15. That is, light oriented to the same direction by the polarization film 10, which is shielded by the polarization function composed of, for example, the conductive particles 40, never reaches the touch sensor pattern 15. Hence, the light does not have brightness in the black state as in the conventional display device. This achieves a display module, e.g., an Oncell projected capacitive liquid crystal display (PCAP-LCD) module that employs an Oncell structure having a high contrast.

Further, the display device 1 according to the first preferred embodiment does not include the polarization film 59 of the conventional display device. Hence, variations in viewing angle and contrast caused by variations in attachment of the polarization film 59 do not exist. This provides the display device 1 having a stable characteristic and improves yields. Still further, a stable display grade is achieved by forming the counter substrate 7 relative to the polarization-axis-direction marks 44, or relative to the touch sensor alignment marks 45 or the color filter alignment marks 46, and by performing the rubbing process. Yet further, pattern shapes of the wires in the touch sensor pattern 15 are free from limitation. This allows patterns or shapes of the wires suitable for the appearance of the wires and a characteristic of a touch detection to be designed.

<Second Preferred Embodiment>

Figure 25:
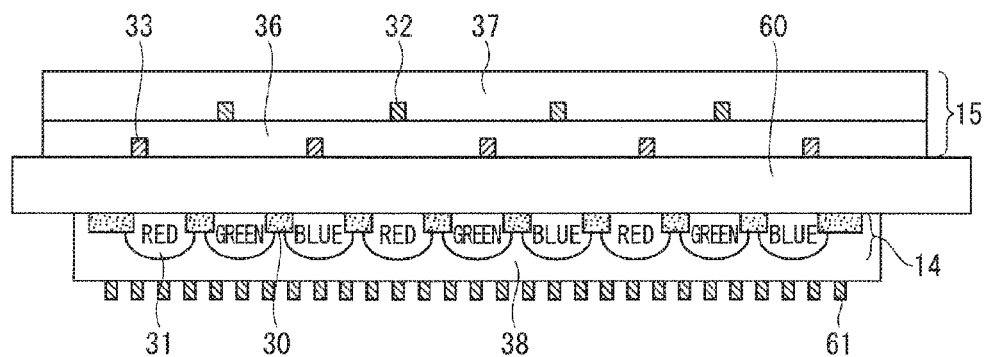
FIG. 25 is a diagram illustrating an example of a configuration of a counter substrate according to a second preferred embodiment of the present invention.

FIG. 25 is a diagram illustrating an example of a configuration of a counter substrate 7 according to a second preferred embodiment of the present invention.

As illustrated in FIG. 25, the counter substrate 7 has a pattern of fine wires 61 (conductive wires) each having a slit shape with a pitch of 150 nm, for example, formed at equal intervals on a surface of an overcoat 38, close to a liquid crystal layer 8. Each fine wire 61 has a function similar to the polarization function described in the first preferred embodiment. That is, the fine wires 61 are formed in the second preferred embodiment instead of the conductive particles in the first preferred embodiment. Thus, an inexpensive glass substrate without a polarization function (e.g., a glass substrate similar to the glass substrate 42 in FIGS. 16 and 17) can be used for a glass substrate 60. Note that an orientation film (not shown) is formed on a surface of the fine wire 61, close to the liquid crystal layer 8. The other configurations are similar to those of the first preferred embodiment (see FIG. 1), and thus the description is omitted.

Figure 26:
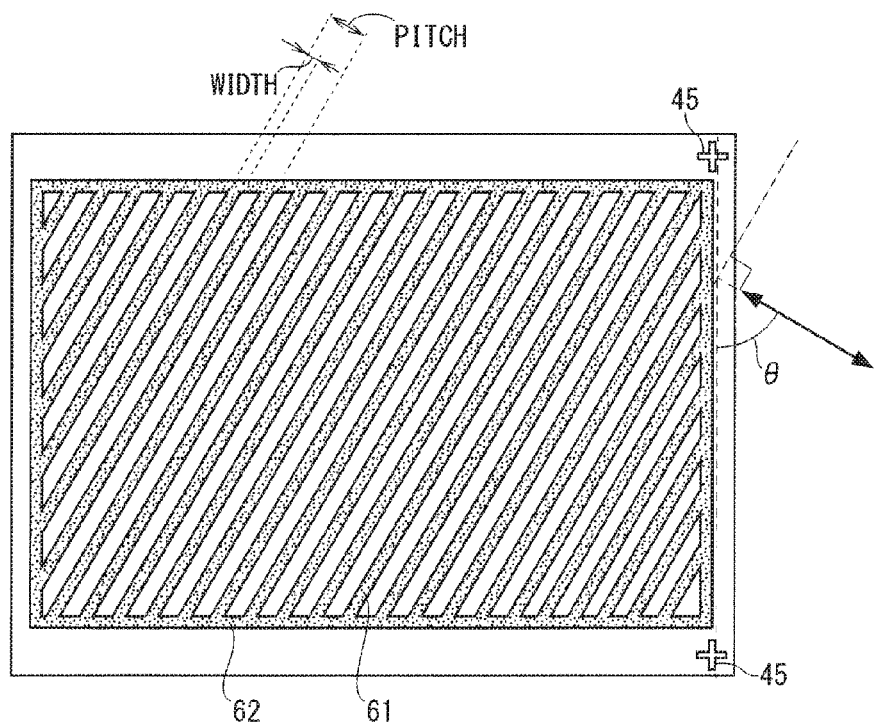
FIG. 26 is a plan view illustrating an example of an arrangement of fine wires according to the second preferred embodiment of the present invention.

FIG. 26 is a plan view illustrating an example of an arrangement of the fine wires.

As illustrated in FIG. 26, the fine wires 61 form a pattern disposed in a direction perpendicular to a polarization axis of a polarization film 10, and are electrically connected to each other in a peripheral frame portion 62 (a peripheral area). Note that the connection of the fine wires 61 is, but not limited to, an electrical connection in the peripheral frame portion 62, as shown in the example of FIG. 26. For example, the fine wires 61 may be connected to each other between adjacent fine wires 61 in an area other than the peripheral frame portion 62. Note that the area electrically connecting the adjacent fine wires 61 is desirably an area to which light is not transmitted, such as a BM portion of a color filter. Moreover, the patterns are desirably formed in a direction orthogonal to the fine wires 61 in connecting the adjacent fine wires 61 somewhere other than the periphery and the BM portion.

FIG. 27 is a diagram illustrating a connection between the fine wire 61 and a counter electrode terminal 63 on a pixel array substrate 6.

As illustrated in FIG. 27, the fine wire 61 in the peripheral frame portion 62 and the counter electrode terminal 63 on the pixel array substrate 6 are electrically connected to each other through a conductive spacer 64 included within a sealing agent 9. Such a configuration provides the fine wire 61 with a function as a counter electrode. Note that the fine wire 61 in the peripheral frame portion 62 and the counter electrode terminal 63 may be electrically connected to each other by applying a conductive paste instead of the conductive spacer in FIG. 27.

The fine wire 61 is formed on the surface of the overcoat 38, close to the liquid crystal layer 8 so that an Al film containing high nitride (a thickness of 50 nm) and an Al alloy film (a thickness of 200 nm) are stacked. The fine wire 61 is also patterned so that its polarization axis forms angle θ with respect to touch sensor alignment marks 45, as illustrated in FIG. 26. For patterning, either direct writing, such as electronic writing or etching, such as dry etching with a high resolution resist may be employed. Note that the Al film containing high nitride simply needs to be selected properly within a range in which the nitride content is 30 to 50 at % and the thickness is 40 to 70 nm.

FIG. 28 is a diagram illustrating another example of the configuration of the counter substrate 7.

As illustrated in FIG. 28, a planarization film 65 may be filled between the fine wires 61, thus to reduce unevenness between the surfaces of each fine wire 61 and the overcoat 38. The reduction in the unevenness advantageously allows the orientation film to stably undergo a rubbing process.

As discussed above, the second preferred embodiment achieves exclusion of noise that enters a touch sensor pattern 15 from close to the liquid crystal layer 8, thus boosting detection sensitivity when a touch is generated. The second preferred embodiment further achieves omission of a counter electrode 39 made of a transparent conductive film formed in the first preferred embodiment. This avoids a decrease of transmittance in the counter substrate 39, thus to reduce power consumption of a display device, and cut back power consumption necessary for processing, e.g., film formation of the counter substrate 39 or cut back the amount of use of In that is commonly used as a material of the counter substrate 39.

Forming the fine wires 61 on the surface close to the liquid crystal layer 8 facilitates an electrical connection between the fine wires 61 and the counter electrode terminal 63 of the pixel array substrate 6. This achieves a stable electrical connection.

Forming the Al film containing high nitride in each fine wire 61, close to a display surface reduces reflection of, for example, external light incident from the display surface and thus improves the appearance of a display screen. Moreover, forming the Al alloy film in the fine wires 61, close to a backlight unit 3 reflects light from the backlight unit 3 to close to the backlight unit 3. This allows the reflected light to be reused in the backlight unit 3 and thus saves power consumption in the backlight unit 3.

Note that a material of each fine wire 61 is, but not limited to, the stack of the Al alloy film and the Al film containing high nitride. A different material may be used as long as the fine wire 61 in the vicinity of the display surface is low reflective and has conductivity. Moreover, some required display grades eliminate a need for the vicinity of the display surface to be low reflective. Hence, in this case, the fine wires may be formed of a conductive and processable material, such as a single layer of an Al alloy or a Cu alloy. An aspect ratio between a film thickness of the fine wire 61 and a wiring width of the fine wire 61 (a ratio of the film thickness to the wiring width) is desirably one or greater.

A wiring pitch and wiring interval of the fine wires 61 simply need to be set properly in view of polarization efficiency and a polarization wavelength area. For example, the wiring interval needs to be set narrowly in a wavelength ranging from 400 to 750 nm (from 380 to 780 nm in some literatures) of a visible-light area, when compared with the wavelength of a short wavelength. Moreover, wavelength λ causing Rayleigh resonance simply needs to be shorter than the wavelength of the short wavelength in order for each fine wire 61 to have a stable polarization function in the visible-light area. Hence, in λ=p×(n+sin x), since refractive index n of, for example, SiO2 is about 1.5 and light is incident from close to the pixel array substrate 6, incident angle x is approximately equal to 0° and wavelength λ of the short wavelength is 400 nm Thus, pitch p is 266 nm. Accordingly, when the interlayer insulating film 36 being a lower layer is made of SiO2 having n of 1.5, the fine wires 61 are set to have a wiring pitch of 266 nm or smaller (a refractive index of a glass substrate used for an LCD is about 1.6, and thus the wiring pitch is 250 nm or smaller). A wiring width of the fine wires 61 is desirably one-half or less of the wiring pitch.

Note that for processing of the fine wire 61, a minimum line width is about 10 nm when the electronic writing is employed and a minimum line width is in the neighborhood of 100 nm when the dry etching is employed. Hence, a line width of the fine wire 61 simply needs to be determined based on a processing method and the wiring pitch. Moreover, another processing method, such as a damascene method may be used when a Cu alloy or the like is used.

FIG. 29 is a diagram illustrating still another example of the configuration of the counter electrode 7.

As illustrated in FIG. 29, the fine wires 61 may be formed between the glass substrate 60 and the color filter pattern 14. In this case, the inexpensive glass substrate without the polarization function can be used for the glass substrate 60. The fine wires 61 are covered with the color filter pattern 14. Hence, the fine wires 61 and the counter electrode terminal 63 of the pixel array substrate 6 (see FIG. 27) are desirably connected to each other through an opening 67 formed on the peripheral frame portion 62 of the fine wires 61.

It is possible to provide each fine wire 61 with a function as a common electrode as illustrated in FIG. 27 for example, when the fine wires 61 are formed in the color filter pattern 14, close to the liquid crystal layer 8 as illustrated in FIG. 25 or FIG. 28. Moreover, a structure illustrated in FIG. 29 can be also configured similarly.

Figure 30:
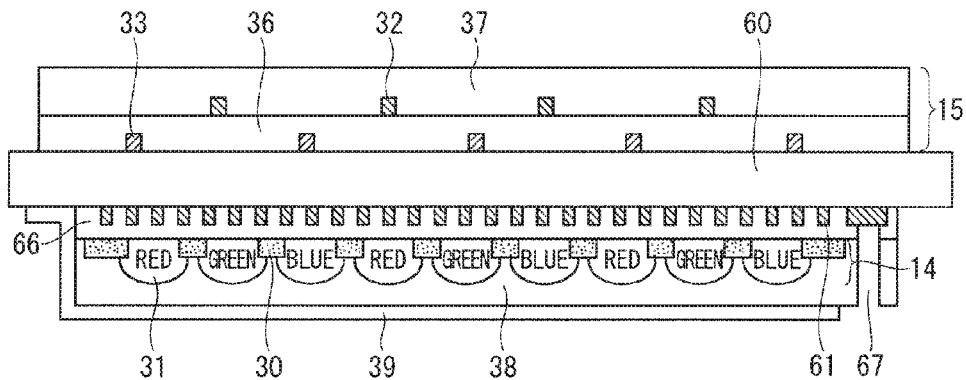
FIG. 30 is a diagram illustrating yet another example of the configuration of the counter substrate according to the second preferred embodiment.

FIG. 30 is a diagram illustrating yet another example of the configuration of the counter substrate 7.

As illustrated in FIG. 30, the counter electrode 39 may be provided on the surface of the overcoat 38, close to the liquid crystal layer 8. Such a structure allows a voltage to be applied to the liquid crystal layer 8 more efficiently than the structure illustrated in FIG. 29.

Figure 31:
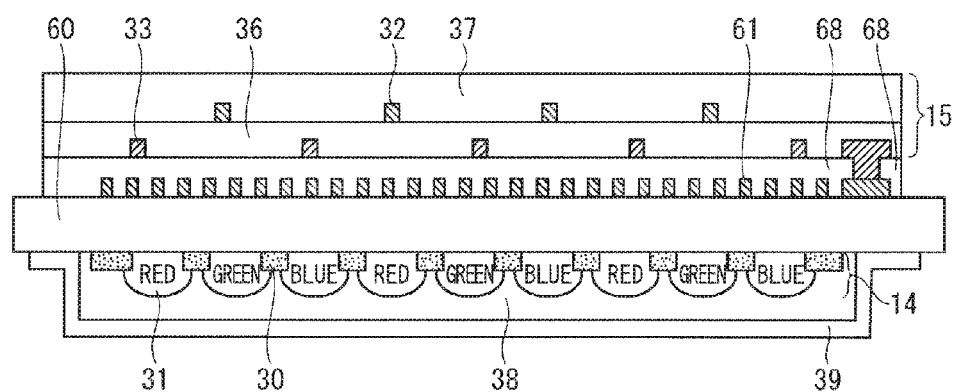
FIG. 31 is a diagram illustrating still yet another example of the configuration of the counter substrate according to the second preferred embodiment.

FIG. 31 is a diagram illustrating still yet another example of the configuration of the counter substrate 7.

As illustrated in FIG. 31, the fine wires 61 may be formed between the glass substrate 60 and the touch sensor pattern 15. In this case, the inexpensive glass substrate without the polarization function can be used for the glass substrate 60. Moreover, the touch sensor pattern 15 is formed above the fine wires 61 through an insulting film 68. At this time, the touch sensor pattern 15 is formed to set, for example, a Y direction of the touch sensor pattern 15 on the basis of marks (the touch sensor alignment marks 45) indicating the polarization axis of each fine wire 61. The insulating film 68 covering the fine wires 61, if planarized, improves processability of the touch sensor pattern 15 and reduces malfunctions due to breaking of wire. Y-direction detection lines 33 and the fine wires 61 are electrically connected to each other through an opening formed in the insulating film 68.

Figure 32:
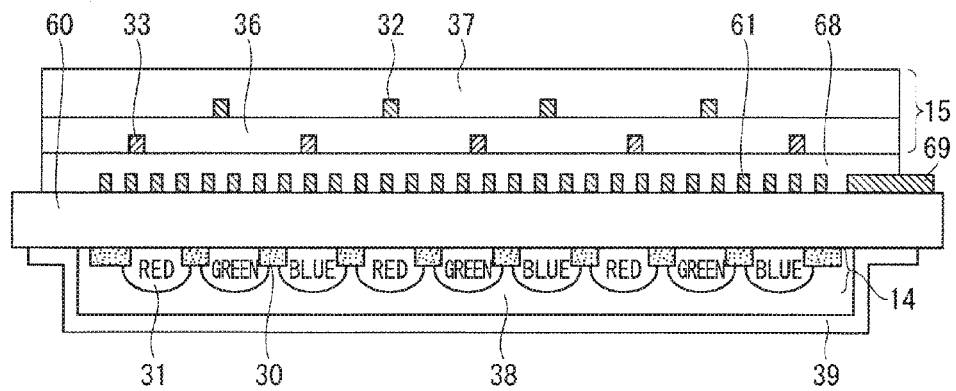
FIG. 32 is a diagram illustrating still another example of the configuration of the counter substrate according to the second preferred embodiment.

FIG. 32 is a diagram illustrating still another example of the configuration of the counter substrate 7.

As illustrated in FIG. 32, the fine wires 61 form a terminal 69 drawn from the peripheral frame portion 62 so as to be electrically connectable to some of terminals that are connected to wires of the touch sensor pattern 15. The other configurations are similar to those illustrated in FIG. 31. The configuration illustrated in FIG. 32 allows grounding for removing noise to be formed. Moreover, each fine wire 61 may be operated as a surface sensor.

As illustrated in FIG. 31 or FIG. 32, the counter electrode 39 made of a transparent conductive film is desirably formed close to the color filter pattern 14 if the fine wires 61 are not formed close to the color filter pattern 14.

<Third Preferred Embodiment>

The first and second preferred embodiments describe attaching the polarization film 10 close to the pixel array substrate 6 (see FIG. 1). A third preferred embodiment describes a pixel array substrate 6 that has a polarization function similar to that of the counter substrate 7 in the first and second preferred embodiments.

Figure 33:
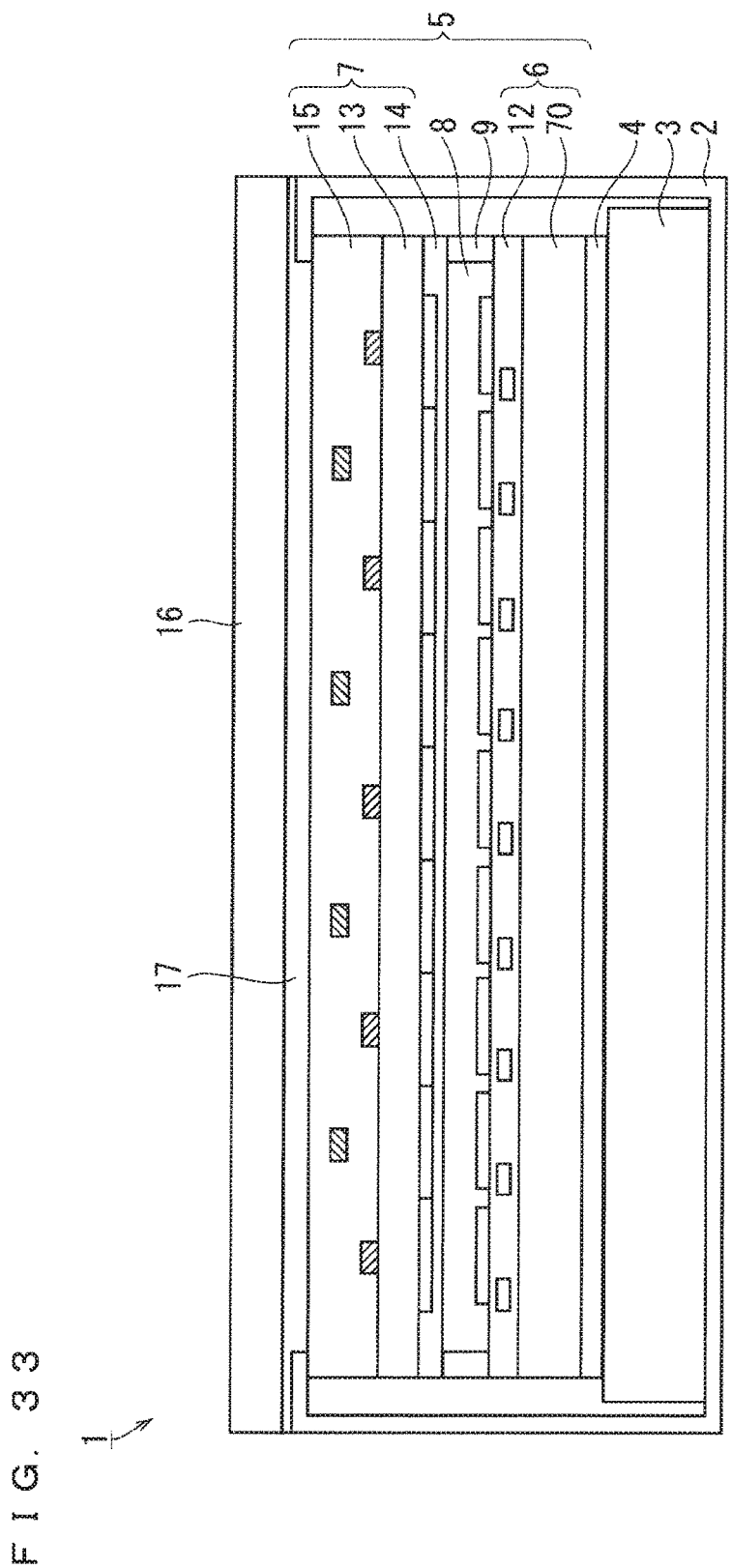
FIG. 33 is a cross-sectional view illustrating an example of a configuration of a display device according to a third preferred embodiment of the present invention.

FIG. 33 is a cross-sectional view illustrating an example of a configuration of a display device 1 according to the third preferred embodiment.

As illustrated in FIG. 33, the pixel array substrate 6 has a transparent substrate 70 and omits the polarization film 10 in the first and second preferred embodiments. The other configurations are similar to those of the first and second preferred embodiments, and thus the description is omitted.

The transparent substrate 70 has a polarization function. Providing the pixel array substrate 6 with the polarization function prevents a decrease in contrast caused by variations in attachment of the polarization film, and thus achieves a display device of high quality.

FIGS. 34 to 38 are cross-sectional views illustrating examples of a configuration of the pixel array substrate 6.

Figure 34:
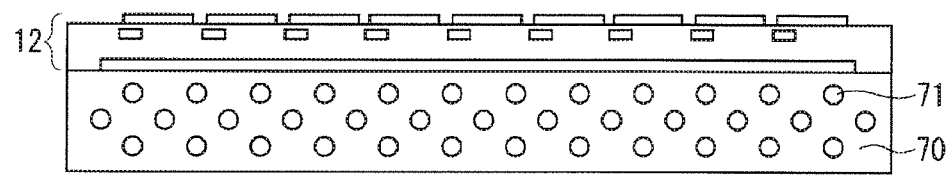
FIG. 34 is a cross-sectional view illustrating an example of a configuration of a pixel array substrate according to the third preferred embodiment of the present invention.

How to provide the pixel array substrate 6 with the polarization function is the same as that in the first and second preferred embodiments. That is, as illustrated in FIG. 34, a conductive particle having a large aspect ratio, a conductive material having a large aspect ratio, e.g., a conductive nano-fiber, or a quenching particle or fiber having a large aspect ratio may be dispersed within the transparent substrate 70 so that a direction perpendicular to a polarization axis is a long axis within the transparent substrate 70. Note that a conductive polymer, a quenching polymer (e.g., a dye polymer), or a quenching compound (e.g., an iodine compound), each having a large aspect ratio, may be selected when the transparent substrate is made of an organic material.

Further, conductive particles 71, when formed between a transparent substrate 72 and a pixel array pattern 12 (see FIG. 35) or on the transparent substrate 72, close to a backlight unit 3 (see FIG. 36), may be applied so that a long axis of each conductive particle 71 is perpendicular to the polarization axis.

Figure 35:
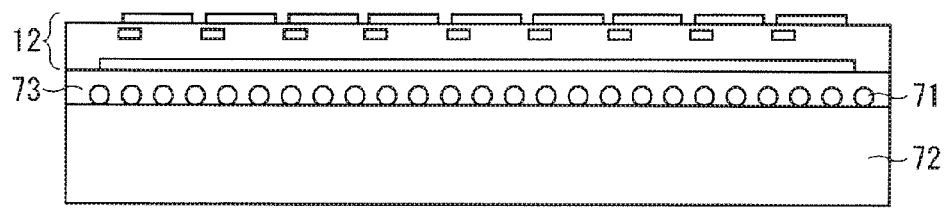
FIGS. 35 to 38 are cross-sectional views illustrating other examples of the configuration of the pixel array substrate according to the third preferred embodiment of the present invention.
Figure 36:
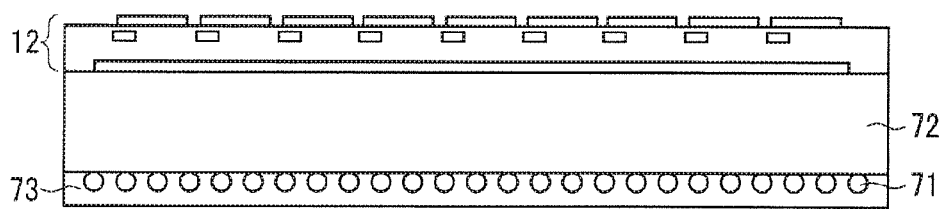
Figure 37:
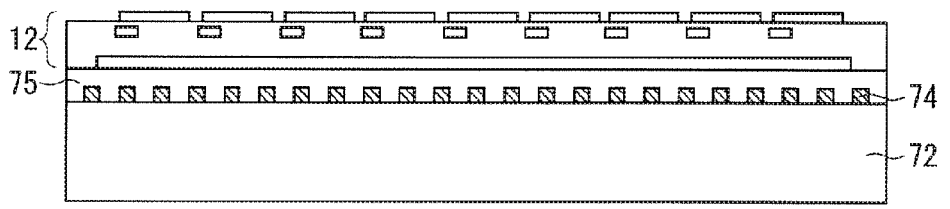
Figure 38:
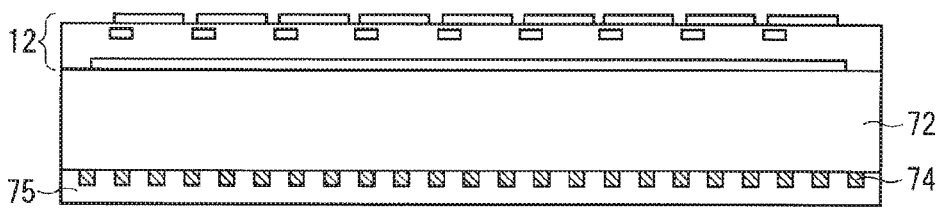

Note that although FIGS. 34 to 36 describe the formation of the conductive particles 71, fine wires 74 may be formed as discussed in the second preferred embodiment (see FIGS. 37 and 38). When the fine wires 74 provides the pixel array substrate 6 with the polarization function, a base material can be different from the counter electrode 7. Accordingly, a wiring pitch and wiring width of each fine wire formed in the pixel array substrate 6, when both set according to the base material, do not necessarily conform to wiring pitch and wiring width of each fire wire formed in the counter substrate 7.

In FIGS. 35 and 36, the transparent substrate 72 is free from a polarization function. That is, the transparent 72 is used instead of the transparent substrate 70 in FIG. 33 when structures in FIGS. 35 and 36 are employed.

Figure 39:
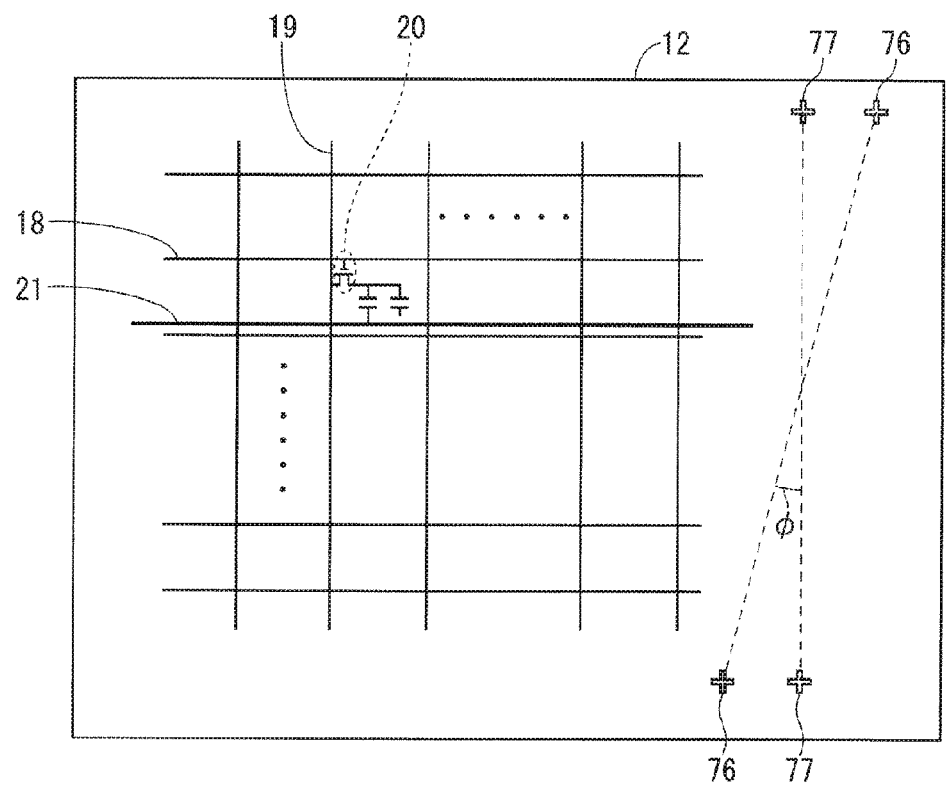
FIG. 39 is a diagram illustrating an example of formation of a pixel array pattern according to the third preferred embodiment of the present invention.

As already described in FIGS. 19 to 21 of the first preferred embodiment, the direction of the polarization axis may be controlled by forming marks. FIG. 39 is a diagram illustrating an example of formation of the pixel array pattern 12. As illustrated in FIG. 39, either at least a pattern of gate wires 18 or source wires 19 of the pixel array pattern 12 may be set, or pixel array alignment marks 77 may be formed, based on polarization-axis-direction marks 76. Alternatively, the polarization function as illustrated in FIGS. 34 to 38 may be formed based on the pixel array alignment marks 77.

Forming the pixel array pattern 12 relative to the polarization-axis-direction marks 76 or forming the polarization function relative to the pixel array alignment marks 77 further prevents variations of the polarization axis from a set value when the counter substrate 7 is superimposed. This provides a display device having a stable characteristic and improves yields.

Figure 40:
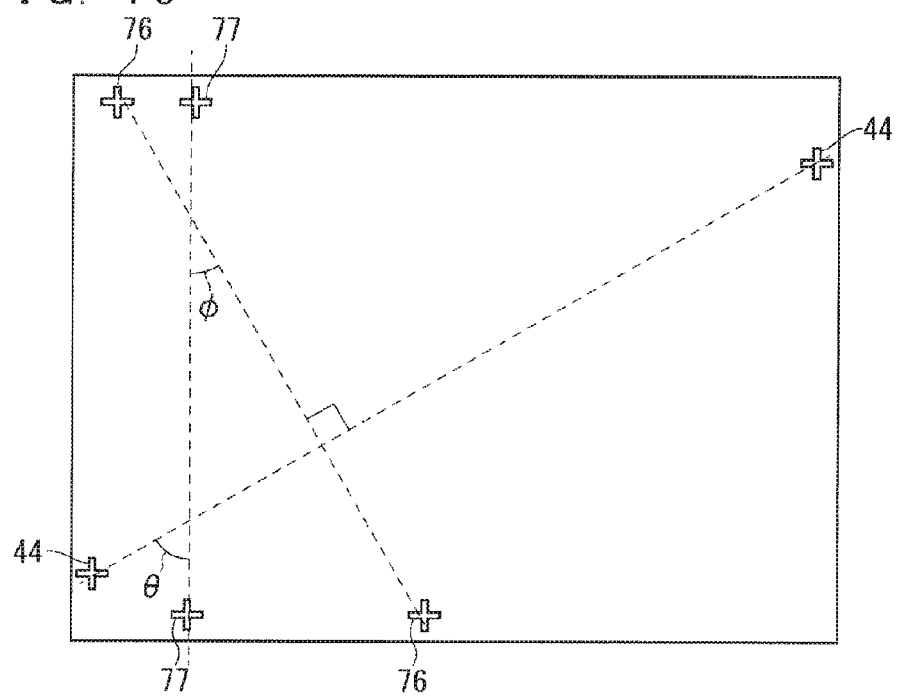
FIG. 40 is a diagram illustrating a relationship between a polarization axis of the pixel array substrate and a polarization axis of the counter substrate in a TN mode.

Note that a relationship between angle $\varphi$ formed by the polarization-axis-direction marks 76 and the pixel array alignment marks 77, and angle $\theta$ formed by polarization-axis-direction marks 44 and the pixel array alignment marks 77 as illustrated in FIG. 40 simply needs to be set properly according to a liquid crystal mode, i.e., $\theta+\varphi=90°$ in a normally white mode in a TN mode, or $\theta=\varphi$ in an IPS mode or an FFS mode, for example.

A rubbing process of an orientation film formed close to the pixel array substrate 6 may be similar to that of the orientation film formed close to the counter substrate 7 (see FIG. 21). At this time, an angle of the axis of a rubbing roller may be set based on the pixel array alignment marks 77. Doing so reduces processing errors between the polarization axis and an orientation direction of a liquid crystal, thus allowing a stable display grade to be achieved. An angle formed by the axis of the rubbing roller and marks indicating the polarization axis (the pixel array alignment marks 77) simply needs to be set properly according to the liquid crystal mode.

It is to be noted that in the present invention, respective preferred embodiments can be freely combined, or can be modified and omitted as appropriate, within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device comprising:
   an array substrate provided with a plurality of pixels in array; and
   a counter substrate oppositely disposed above said array substrate with a liquid crystal layer interposed between said counter substrate and said array substrate,
   wherein said counter substrate includes
      a touch sensor wiring pattern aligned to wiring pattern alignment marks along a wiring pattern direction and disposed in such a manner that at least part of said touch sensor wiring pattern and said wiring pattern direction is not parallel or orthogonal to a first polarization axis of polarization light aligned to polarization alignment marks along the first polarization axis direction and incident on said liquid crystal layer from close to said array substrate, and
      a polarization layer closer to said liquid crystal layer than to said touch sensor wiring pattern, having a second polarization axis with an angle of 0 degrees or 90 degrees with respect to said first polarization axis.

2. The liquid crystal display device according to claim 1, wherein said touch sensor wiring pattern is composed of a plurality of wires in a row direction and a plurality of wires in a column direction, both arranged to cross each other through an insulating film when viewed stereoscopically.

3. The liquid crystal display device according to claim 1, wherein
said polarization layer includes any of a conductive particle, a conductive fiber, a quenching particle, or a quenching fiber, each having an aspect ratio of two or more, having a dimension of 100 nm or greater in a long-axis direction, and oriented so that said long-axis direction is orthogonal to said first polarization axis.

4. The liquid crystal display device according to claim 1, wherein said polarization layer includes a plurality of conductive wires each arranged to extend in a direction orthogonal to said first polarization axis at equal intervals.

5. The liquid crystal display device according to claim 4, wherein each of said conductive wires is electrically connected to each other at at least one or more points.

6. The liquid crystal display device according to claim 5, wherein each of said conductive wires is electrically connected to an electrode provided in said array substrate in a peripheral area surrounding each of said conductive wires.

7. The liquid crystal display device according to claim 4, wherein
each of said conductive wires is arranged to extend at an interval of 250 nm or smaller, and
a width of each of said conductive wires is one-half or less of said interval.

8. The liquid crystal display device according to claim 4, wherein each of said conductive wires is a stacked film of an Al alloy film close to said liquid crystal layer and an Al film containing high nitride opposite to said liquid crystal layer with respect to said Al alloy film.

9. The liquid crystal display device according to claim 2, wherein each of said wires in said row direction and each of said wires in said column direction are formed by wires each having a width of 10 μm or smaller.

10. The liquid crystal display device according to claim 2, wherein each of said wires in said row direction and each of said wires in said column direction have curved-line portions.

11. The liquid crystal display device according to claim 1, wherein
said counter substrate further includes a color filter pattern closer to said liquid crystal layer than to said touch sensor wiring pattern and has a first mark indicating a direction of said second polarization axis of said polarization layer,
at least part of said touch sensor wiring pattern, formed close to said liquid crystal layer is formed based on said first mark and has a second mark indicating a location of said touch sensor wiring pattern, and
said color filter pattern is formed based on said first mark or said second mark.

12. The liquid crystal display device according to claim 11, wherein
said counter substrate further includes an orientation film closest to said liquid crystal layer, and
said orientation film undergoes a rubbing process based on said first mark or said second mark.

13. The liquid crystal display device according to claim 1, wherein
said counter substrate further includes a color filter pattern closer to said liquid crystal layer than to said touch sensor wiring pattern and has a first mark indicating a direction of said second polarization axis of said polarization layer,
said color filter pattern is formed based on said first mark and has a third mark indicating a location of said color filter pattern, and
at least part of said touch sensor wiring pattern, formed close to said liquid crystal layer is formed based on said first mark or said third mark.

14. The liquid crystal display device according to claim 13, wherein
said counter substrate further includes an orientation film closest to said liquid crystal layer, and
said orientation film undergoes a rubbing process based on said first mark or said third mark.

15. The liquid crystal display device according to claim 1, wherein
said counter substrate further includes a color filter pattern closer to said liquid crystal layer than to said touch sensor wiring pattern,
said touch sensor wiring pattern has a second mark indicating a location of said touch sensor wiring pattern,
said color filter pattern is formed based on said second mark and has a third mark indicating a location of said color filter pattern, and
said polarization layer is formed based on said second mark or said third mark.

16. The liquid crystal display device according to claim 15, wherein
said counter substrate further includes an orientation film closest to said liquid crystal layer, and said orientation film undergoes a rubbing process based on said second mark or said third mark.

17. The liquid crystal display device according to claim 1, wherein said polarization layer includes a plurality of conductive wires connected to a rectangular frame, and each wire arranged to extend in a direction orthogonal to said first polarization axis at equal intervals, and wherein the wires are neither orthogonal nor parallel to the rectangular frame.

18. A liquid crystal display device comprising:
an array substrate provided with a plurality of pixels in array; and
a counter substrate oppositely disposed above said array substrate with a liquid crystal layer interposed between said counter substrate and said array substrate,
wherein said counter substrate includes
a touch sensor wiring pattern having a plurality of wires of a same shape extending in two intersecting directions, each of the two intersecting directions not parallel or orthogonal to a first polarization axis of polarization light incident on said liquid crystal layer from close to said array substrate, and
a polarization layer closer to said liquid crystal layer than to said touch sensor wiring pattern, having a second polarization axis with an angle of 0 degrees or 90 degrees with respect to said first polarization axis.

19. The liquid crystal display device according to claim 18, wherein said polarization layer includes a plurality of conductive wires connected to a rectangular frame, and each wire arranged to extend in a direction orthogonal to said first polarization axis at equal intervals, and wherein the wires are neither orthogonal nor parallel to the rectangular frame.

* * * * *